(12) United States Patent
Pletz et al.

(10) Patent No.: US 12,152,365 B2
(45) Date of Patent: Nov. 26, 2024

(54) APPARATUS AND METHOD FOR CHANGING BUCKET WHEELS

(71) Applicant: Technological Resources Pty. Limited, Melbourne (AU)

(72) Inventors: Rudolf Pletz, Weisskirchen (AT); Belmin Smajlovic, Kapfenberg (AT); Lukas Doesinger, Leoben (AT); Michael Edlinger, Fohnsdorf (AT)

(73) Assignee: TECHNOLOGICAL RESOURCES PTY LIMITED, Melbourne (AU)

( * ) Notice: Subject to any disclaimer, the term of this patent is extended or adjusted under 35 U.S.C. 154(b) by 904 days.

(21) Appl. No.: 17/268,115

(22) PCT Filed: Aug. 13, 2019

(86) PCT No.: PCT/IB2019/056867
§ 371 (c)(1),
(2) Date: Feb. 12, 2021

(87) PCT Pub. No.: WO2020/035790
PCT Pub. Date: Feb. 20, 2020

(65) Prior Publication Data
US 2021/0198863 A1 Jul. 1, 2021

Related U.S. Application Data

(60) Provisional application No. 62/718,160, filed on Aug. 13, 2018.

(51) Int. Cl.
*E02F 3/18* (2006.01)
*B62B 3/10* (2006.01)
(Continued)

(52) U.S. Cl.
CPC ............... *E02F 3/188* (2013.01); *B62B 3/10* (2013.01); *E02F 3/241* (2013.01); *E02F 3/246* (2013.01);
(Continued)

(58) Field of Classification Search
CPC ... E02F 3/18; E02F 3/181; E02F 3/188; E02F 3/241; E02F 3/246
See application file for complete search history.

(56) References Cited

U.S. PATENT DOCUMENTS 3,020,656 A * 2/1962 Linden .................... E02F 3/248
37/190
4,702,023 A 10/1987 McDowell
(Continued)

FOREIGN PATENT DOCUMENTS

CN 202542494 U 11/2012
WO 2017144095 A1 8/2017

OTHER PUBLICATIONS

Jan. 17, 2020—(WO) International Search Report—App PCT/IB2019/056867.

*Primary Examiner* — Gary S Hartmann
(74) *Attorney, Agent, or Firm* — Banner & Witcoff, Ltd.

(57) ABSTRACT

A bucket wheel machine 100 having a base 102 and an operating block 104. The operating block has a bucket wheel 106, a bearing 112,114, and at least one of a ring chute 120, a bucket wheel chute 108, and a bucket wheel drive 116. The operating block 104 is detachably attached to the base of the bucket wheel machine 102. The operating block 104 also has a support frame 130 which is connected to the bearing 112,114.

13 Claims, 15 Drawing Sheets

(51) Int. Cl.
*E02F 3/24* (2006.01)
*E02F 7/06* (2006.01)
*E02F 9/00* (2006.01)
E02F 7/02 (2006.01)

(52) U.S. Cl.
CPC ............... *E02F 7/06* (2013.01); *E02F 9/00* (2013.01); *E02F 3/181* (2013.01); *E02F 7/02* (2013.01)

(56) References Cited

U.S. PATENT DOCUMENTS

| | | | | |
|---|---|---|---|---|
| 5,857,274 | A * | 1/1999 | Rudiger | E21C 47/02 37/95 |
| 7,921,581 | B2 * | 4/2011 | Jager | E02F 7/02 37/190 |
| 2021/0355650 | A1 * | 11/2021 | De Wet | B62D 59/04 |
| 2024/0059509 | A1 * | 2/2024 | Pfandl | E02F 3/181 |

* cited by examiner

APPARATUS AND METHOD FOR CHANGING BUCKET WHEELS

CROSS-REFERENCE TO RELATED APPLICATIONS

This application is a U.S. National Stage application under 35 U.S.C. § 371 of International Application PCT/IB2019/056867, filed Aug. 13, 2019, which claims the benefit of priority to U.S. Provisional Application No. 62/718,160, filed Aug. 13, 2018. Benefit of the filing date of each of these prior applications is hereby claimed. Each of these prior applications is hereby incorporated by reference in its entirety.

FIELD OF INVENTION

The present invention relates to a bucket wheel machine system including a bucket wheel machine like a bucket wheel reclaimer, a bucket wheel excavator or a bucket wheel stacker reclaimer and to a method for maintenance of such bucket wheel machine.

BACKGROUND

During the service life of a bucket wheel machine like a bucket wheel reclaimer, it is repeatedly necessary to provide maintenance, in particular of those parts which are subject to intense wear and tear during operation, e.g. the bucket wheel, the buckets of the bucket wheel, the bucket wheel chute, the ring chute and the bucket wheel drive.

CN202542494 disclose a bucket wheel machine which comprise a locking mechanism for locking the bucket wheel into place and a method for maintenance of the bucket wheel machine. By locking the bucket wheel into place, it is easier and safer to replace of the individual buckets on the bucket wheel.

In case replacements for the elements to be maintained are available, the known approach on this includes removing the ring chute, the bucket wheel chute, the bucket wheel drive and eventually the bucket wheel separately from the bucket wheel reclaimer, followed by mounting the replacement bucket wheel, the replacement bucket wheel drive, the replacement bucket wheel chute and the replacement ring chute, including the necessary adjustments therebetween. This known approach, however, is time consuming, which leads to a significant amount of time during which the bucket wheel reclaimer is not operating.

Additionally, the removal of the components or installation of replacement components require lifting means such as a crane, since these components are mounted at some height above the ground. Crane operations always poses a safety risk for the surrounding people and equipment and the operations are slow.

It is therefore an object of the present invention to provide a bucket wheel machine system and a method for maintenance of such bucket wheel machine allowing for faster and safer maintenance and which provides a reduction in the amount of time the bucket wheel machine is not operating due to maintenance and the like.

SUMMARY OF THE INVENTION

According to a first aspect of the invention a bucket wheel machine is provided comprising a base and an operating block, said operating block comprising a bucket wheel, a bearing, and at least one of a ring chute, a bucket wheel chute, and a bucket wheel drive, the operating block is detachably attached to the base of the bucket wheel machine, the bucket wheel is rotatably connected to the bearing, wherein the operating block further comprise a support frame connected to said bearing, the support frame is adapted for supporting the weight of the operating block.

Typically, the bucket wheel, and at least one of the ring chute, the bucket wheel chute and the drive are changed/repaired simultaneously during maintenance at regular time intervals. In the present invention these components are all connected in the operating block and may therefore be easily removed together in one operation. It is therefore much faster to remove these components and replace them since this can be done in one step. The bearing is the connection between the bucket wheel and the base of the bucket wheel machine and it is designed to support the weight of the operating block.

The support frame is connected to the bearing. When the operating block is not attached to a bucket wheel machine the support frame can be placed on a support structure or the like to easy and safe storage of the operating block. Because it is connected to the bearing it is not necessary to support any other parts of the operating block. The removal of the operating block may be carried out without any additional support of the drive, chute etc. and it is possible to perform a crane less change out of the operating block. This is possible because the bucket wheel machine can be place the operating block directly onto the support structure. The change of the complete assembly will reduce the shutdown time because the time-consuming changing or repair of e.g. the buckets and liners can be done in the maintenance area while the bucket wheel machine is working with a second operating block, i.e. a second set of bucket wheel, chute etc. The inventors have found that when the operation block comprise a support frame which is adapted for the weight of the operating block it is possible to support the operation block during removal/installation by a support structure standing below the bucket wheel machine. The time-consuming lifting operations by crane can therefore be avoided.

The bucket wheel is rotatable connected to the bearing through a shaft. The shaft is attached to the bucket wheel at the center of the bucket wheel. The rotational movement of the shaft (and the bucket wheel) around the center axis of the shaft is provided by the drive. The center axis goes through the center point of the bucket wheel. The center of the bucket wheel may therefore be referred to as the rotation axis.

In a preferred embodiment the bearing is detachably attached on top of the base. The structure of the base may be designed to engage with the bearing. By attaching the bearing onto the base it is possibly to configure the base so the operating block is kept in place simply by resting on the base. The configuration allows easy attachment of the operating block since it is kept in place as long as the weight of the operating block is supported by the bucket wheel machine, i.e. as long as it is lifted from the ground. Any fastening means used to further engaging the base and operating block is mainly to secure the operating block in place.

In a preferred embodiment of the invention the bucket wheel machine comprises a boom, said boom being located adjacent the operating block and a main structure of the bucket wheel machine, and wherein the support frame is attached to the boom. The support frame may comprise a boom engaging surface which can be attached to the boom. By engaging the support frame to the boom, the support frame may help to keep the operating block mounted onto the bucket wheel machine during use. The support frame may also act as an interface or contact surface between the boom and the operating block. This this especially advantageous during installation of a new operating block since any damage caused by unintentional contact between the boom and operating block will occur to the support frame and not the bucket wheel, chutes, or drive. Typically, the drive is also attached to the boom to prevent the drive itself from rotating when rotating the shaft.

In another preferred embodiment the support frame comprises one or more support areas located below the bearing. The terms up, down, below, and above are all used to describe directions relative to gravity. The wording "below the bearing" should be understood as located in one or more planes perpendicular to the direction of gravity and closer to the center of the earth, i.e. the support areas are located closer to the ground than the bearing. This location of the support areas allows for easy support from below by a support structure, support platform or the like.

Preferably a part of the support frame, such as the entire support frame, is located below the bearing. This position ensures that the support frame do not interfere with the position of the bucket wheel chute or bucket wheel drive which both are located above this position. The support frame may therefore be a fixed part of the operating block both during use and when the operating block is detached from the bucket wheel machine. Preferably the support areas of the support frame is at least located below the bearing.

In a preferred embodiment the support frame comprises one or more support areas located on different sides of the bucket wheel. This design provides greater stability to the operating block when it is detached from the bucket wheel machine. Preferably one or more of the support areas may be located directly below the rotation axis of the bucket wheel i.e. below the bearing. This position is close to the center of mass for the operating block and provides the most stability. Typically, a bearing is located on each side of the bucket wheel and it is preferred to have the support frame attached to both bearings. In one embodiment the support frame comprises at least two substantially parallel bars, each connected to a bearing. The substantially parallel bars are preferably connected by one or more cross bars to provide U-shape, H-shape a square or the like. The cross bar should be mounted to the parallel bars at a distance from the bearing such that it does not contact the bucket wheel or the buckets. This distance is typically greater than the length of the bucket wheel radius (including the buckets mounted on the bucket wheel).

In a preferred embodiment the support frame comprises a support area which faces substantially downwards to provide a safe and reliable contact with e.g. a support structure. This allows the operating block to be safely placed on a support structure or support platform which has a corresponding surface without the need of fastening means to stabilize the operating block. In this context, facing substantially downwards means that the support area may be a flat horizontal surface perpendicular to the direction of gravity or have an offset from this direction of no more than 45 degrees. The Support area may comprise protrusions/recess'. In any case the surface on the support structure should have a corresponding surface.

The base of the bucket wheel machine is the portion of the bucket wheel machine adapted for being detachably attached to the operating block. The base may have any suitable surface on which the operating block may rest. It may e.g. comprise a horizontal surface, protrusions/recess' and inclined surface as described above, which may engage with a corresponding surface of the bearing.

In a preferred embodiment the bucket wheel machine comprises ballast engaging means located below boom. Alternatively, it may also be located below the base. The ballast engaging means allows for a ballast to be attached to the bucket wheel machine. This is advantageously when removing the heavy operating block to prevent the bucket wheel machine from tipping over. The ballast may any type of heavy object such as a cement block, a foundation etc. Preferably the ballast is moveable and the bucket wheel machine is preferably capable of lifting both the operating block and the ballast weight. The ballast engaging means may be a hook, such as a metal hook, adapted for engaging a metal ring on the ballast.

According to another aspect of the invention a bucket wheel machine system is provided comprising: a bucket wheel machine comprising a base and an operating block, the operating block comprising a bucket wheel, a bearing, and at least one of a ring chute, a bucket wheel chute and a bucket wheel drive, the bucket wheel is rotatably connected to the bearing, wherein the operating block further comprises a support frame connected to said bearing, the support frame is adapted for supporting the weight of the operating block; and a support structure for supporting the operating block, said support structure having a receiving surface located in an upper part of the support structure adapted for receiving the block placed thereon. The support structure may be a steel frame which can carry the weight of the operating block and which is adapted for receiving the operating block and for supporting it. Preferably an operating block is lowered onto the support structure while it is attached to the bucket wheel machine. When the support area of the support frame contacts the receiving surface and the weight of the operating block is transferred to the support structure, the operating block may be disconnected from the bucket wheel machine. The operating block may be placed on the support structure by the bucket wheel machine without use of additional aids or machines.

In a preferred embodiment of the bucket wheel machine system, the receiving surface of the support structure is engageable with the support areas of the operating block. To provide a good contact between the support structure and the support frame of the operating block the support structure and support frame may be equipped with mutually corresponding surfaces. This is to increase the contact area between them. Preferably the operating block may be fastened to the support structure by fastening means to ensure a more secure fastening. Such fastening means may be nuts and bolts.

In a preferred embodiment of the invention the support structure is adapted for moving. The support structure may comprise wheels or tires. Once the operating block has been disconnected from the bucket wheel machine the support structure comprising the operating block may be moved away for maintenance. It may either be attached to a vehicle or the support structure may comprise a driving means, such as a motor to provide the movement. When the support structure comprises driving means, the change out sequence of the operating block may be done automatically by the bucket wheel machine itself by automatically communicating with it. In one embodiment of the invention the support structure may be a rail mounted trolley. In another embodiment of the invention the support structure may be a modular trailer such as a Self Propelled Modular Transporter (SPMT). When the support structure comprises driving means it may drive to the maintenance area.

According to another aspect of the invention a method of removing an operating block from a base of a bucket wheel machine is provided. The operating block comprising a bucket wheel, a bearing, and at least one of a ring chute, a bucket wheel chute, and a bucket wheel drive, the bucket wheel is rotatably connected to the bearing, wherein the operating block further comprise a support frame connected to said bearing, the method comprising:

provoiding a support structure having a receiving surface located in an upper part of the support structure and a bucket wheel machine said bucket wheel machine having an operating block detachably attached to the base approximating and contacting the bottom of the support frame and the receiving surface of the support structure detaching the operating block from the base by removing any connection means connecting the bucket wheel machine and the operating block; and separating the operating block from the base preferably by either lowering the base of the bucket wheel machine or raising the receiving surface of the support structure.

The support frame and the support structure may be approximated by either moving the support structure and/or the bucket wheel machine. Typically, the support structure is located at a maintenance area and the bucket wheel machine will drive to the maintenance area for maintenance. At the maintenance area the support structure and the operating block is placed such that the operating block can be lowered onto the support structure. Preferably the operating block is lifted by the bucket wheel machine so that an empty support structure may be driven in below the operating block. Once the support structure and operating block is aligned, the receiving surface and the support frame is contacted. This may be done by either lifting the receiving surface towards the operating block, and/or by lowering the boom of the bucket wheel machine so the operating block is lowered onto the receiving surface. The receiving surface may be lifted by e.g. hydraulics located on the support structure or by lifting the support structure by e.g. a lift.

When the receiving surface and the support frame is in contact a pressure change in the bucket wheel machine can be measured. This is because at least some of the weight of the operating block has been transferred onto the support structure. The pressure is measured in a luff system of the bucket wheel machine and the operating block should be lowered until a certain pressure change at the luff system is detected. The operating block may be further lowered until the pressure indicate that the entire weight is transferred onto the support structure.

The operating block is detached from the bucket wheel machine by removing all connection means connecting them. This covers fastening means such as bolt connections, pin connections, electrical wiring, lubrication lines, hydraulic lines, and water lines. The connection means may be accessed from the support structure or from the bucket wheel machine, such as from the boom.

When the connection means has been disconnected, the operating block may be removed. At this point the operating block and bucket wheel machine may still have surfaces which are in contact (i.e. the bearing and base, and/or frame and boom). Preferably the operating block is at this point supported by the support structure, but it may still rest on the base/boom of the bucket wheel machine. The removal is carried out by either lowering the base of the bucket wheel machine (i.e. the boom) or raising the receiving surface of the support structure so that the full weight of the operating block is transferred onto the support structure.

In a preferred embodiment of the above described method it comprises the steps of:

providing a support structure having a receiving surface located in an upper part of the support structure and a bucket wheel machine said bucket wheel machine having an operating block detachably attached to the base lowering the base (i.e. the boom) of the bucket wheel machine to contact the support frame of the operating block with the receiving surface and thereby placing the operating block onto the support structure detaching the operating block from the base by removing any connection means connecting the bucket wheel machine and the operating block; and lowering the base (i.e. the boom) of the bucket wheel machine to separate the operating block from the bucket wheel machine.

In a preferred embodiment of the invention the method further comprises a step of connecting ballast weight to the bucket wheel machine. The connected ballast weight serves the purpose of keeping the bucket wheel machine in balance when the heavy operating block is removed.

In a preferred embodiment of the above mentioned method for removing an operating block, further comprise the following steps for maintaining the bucket wheel machine. The method further comprising the steps of:

providing a replacement operating block, said operating block being located on a support structure;

approximating the replacement operating block and the base;

contacting the replacement operating block with the base;

attaching the replacement operating block to the base by connecting the connection means;

separating the replacement operating block from the support structure.

The new or refurbished operating block may be transported nearby the bucket wheel machine on a support structure. The base of the bucket wheel machine is at this point in a lowered position and the bearing of the operating block may be placed above the base. The operating block and the base is further approximated by either raising the base of the bucket wheel machine or lowering the receiving surface of the support structure. This movement is continued until the receiving surface of the support structure and the base contacts and the weight of the operating block can be transferred from the support structure onto the base.

In a preferred embodiment the method comprises the subsequent steps of:

connecting ballast weight to bucket wheel machine;

lifting up the boom including ballast weight;

driving the empty bucket wheel trolley below the bucket wheel machine;

lowering the boom to place the operating block onto trolley, until a certain pressure change at the luff system is detected;

opening all connections between boom and Bucket wheel assembly;

further lowering of boom, to rest the operating block on the trolley moving out the trolley;

whereby the removal of the operating block is complete.

Preferably the method may additionally comprise one or more of the subsequent steps of:

moving the bucket wheel machine to a second maintenance position;

placing a new or refurbished operating block below the bucket wheel machine;

lifting up the boom until a certain pressure change is detected in the luffing cylinders;

connecting all connections between boom and BW assembly;
Further lifting up the boom;
moving away empty trolley
lowering the boom for ballast removal and remove ballast
recommissioning machine and put back into operation.

FIGURES

Preferred embodiments of the invention shall now be described with reference to the attached drawings, in which FIG. 1 shows a perspective view of a bucket wheel machine according to one embodiment of the invention;

DETAILED DESCRIPTION

Figure 1:
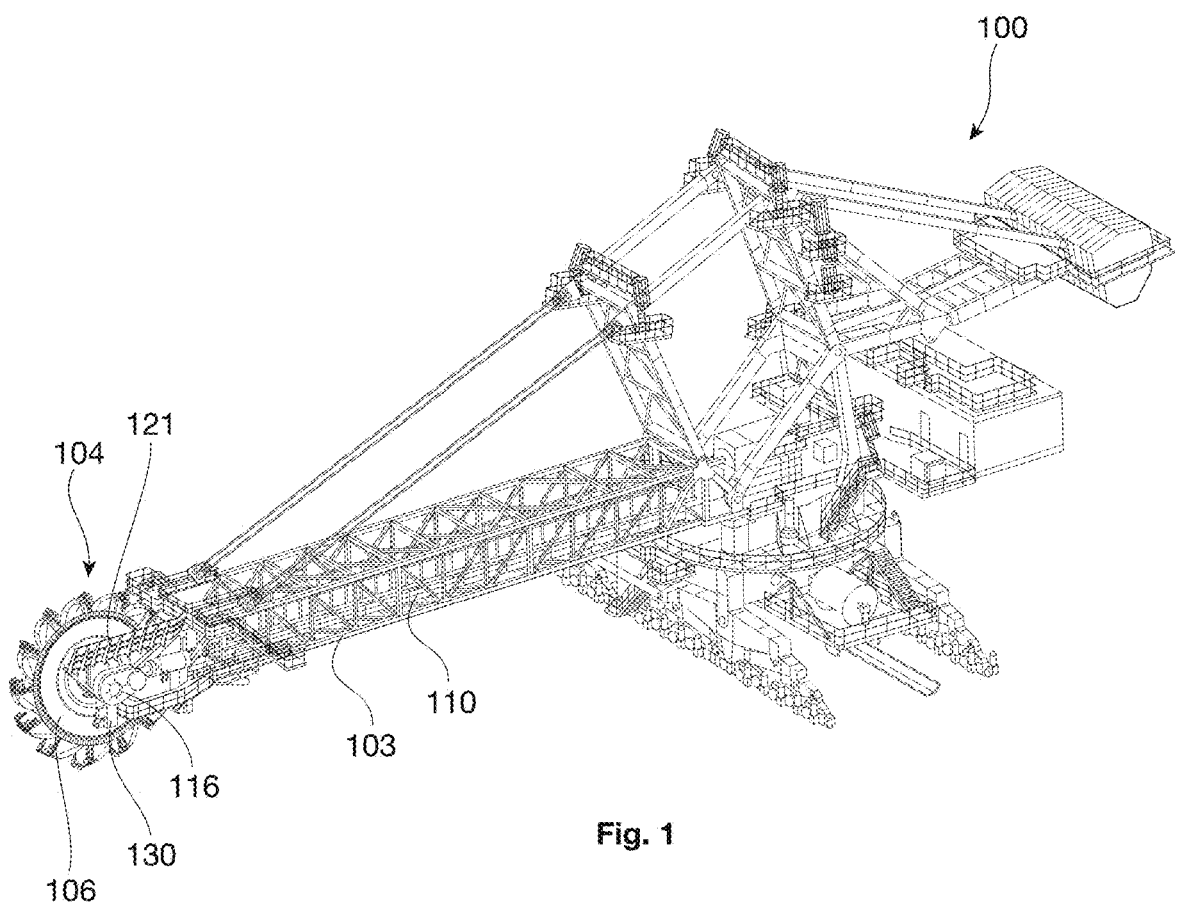
Figure 2:
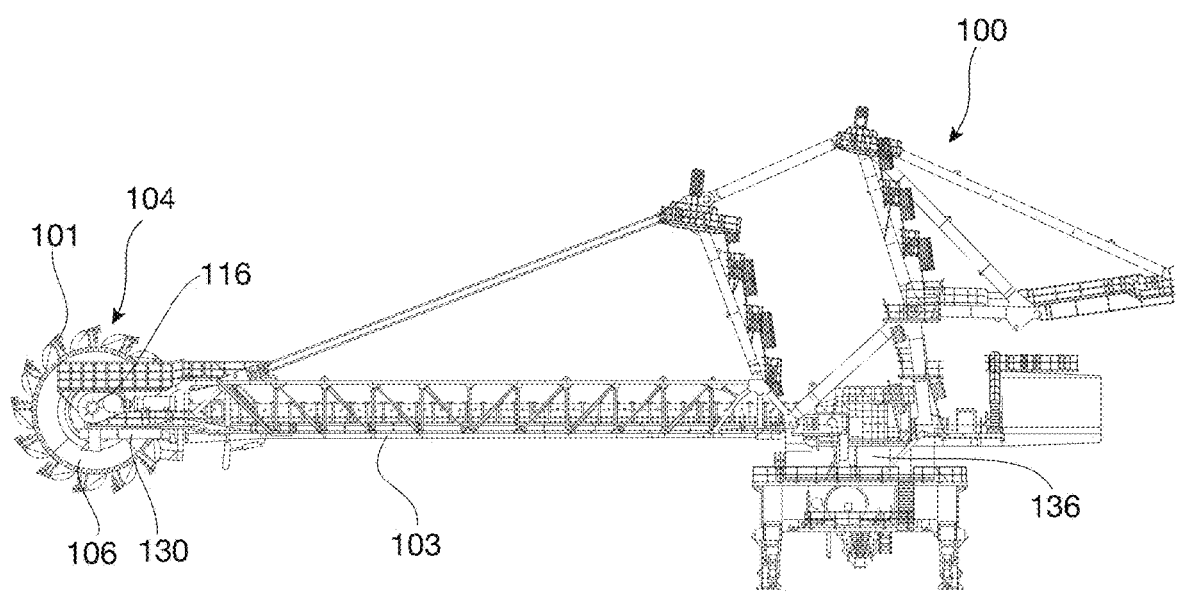
FIG. 2 shows a side view of a bucket wheel machine according to one embodiment of the invention.

A bucket wheel machine 100 according to one embodiment of the invention is shown in FIG. 1 and FIG. 2 in a perspective view and side view, respectively. The operation of the bucket wheel machine 100 according to the present embodiment of the invention corresponds to that of a conventional bucket wheel machine, such that a detailed explanation thereof may be omitted, as the skilled person is already familiar with such operation and the details thereof. The bucket wheel machine 100 includes a base 102 and an operating block 104. The operating block 104 comprises a bucket wheel 106, a bearing 112 and 114, a ring chute 120, a bucket wheel chute 108, and a bucket wheel drive 116. The operating block 104 is detachably attached to the base 102 of the bucket wheel machine 100. The operating block 104 rests on the base 102 and is kept in place mainly by means of the weight of the operating block 104. Additionally, a number of bolt and pin connections (not shown) are used to securely fasten the operating block 104 in place. The bucket wheel 106 is rotatably connected to the bearing 112 and 114, by means of a shaft 117. The bucket wheel is fixed on the shaft and as the drive 116 rotates the shaft 117 the bucket wheel 106 rotates with it. The operating block 104 further includes a support frame 130 connected to the bearing 112 and 114, which is adapted for supporting the weight of the operating block 104. From a side view the bucket wheel 106 has a circular shape. A plurality of buckets 101 are detachably attached to the circumference of the bucket wheel 106. Along at least a part of the circumference the bucket wheel 106 comprises a ring chute 120. The ring chute 120 functions as a back wall of the buckets and keeps material in the buckets 101 until it reaches the bucket wheel chute 108. From the bucket wheel chute 108 material is transferred onto a conveyor 110. The bucket wheel drive 116 is attached to the operating block 104 at one side of the bucket wheel (the drive side), and the bucket wheel chute 108 is attached to the operating block 104 at the opposite side of the bucket wheel 106 (the chute side). The bucket wheel machine 100 differs from a conventional bucket wheel machine in that the operating block 104 is provided for being detached and separated from the base 102, such that the bucket wheel 106, the bucket wheel chute 108, the ring chute and the bucket wheel drive 116 can be removed from the base 102 of the bucket wheel machine 100 in combination.

The bucket wheel machine 100 comprises a boom 103. The operating block 104 is located in one end of the boom 103. The opposite end of the boom 103 is attached to a main structure 136 of the bucket wheel machine 100. The operating block end of the boom 103 is referred to as the distal end of the boom 103. The proximate end of the boom is towards the main structure 136. In the following, reference to a 'distal direction' means a direction going from the main structure 136 towards the distal end of the boom 103. The base 102 is a part of the boom 103 which is located in the distal end of the boom 103. A drive cover 121 is located above the drive side bearing 114 to protect the drive 116 and bearing 114 from any material which accidently falls out of the buckets 101 towards the drive side.

Figure 3:
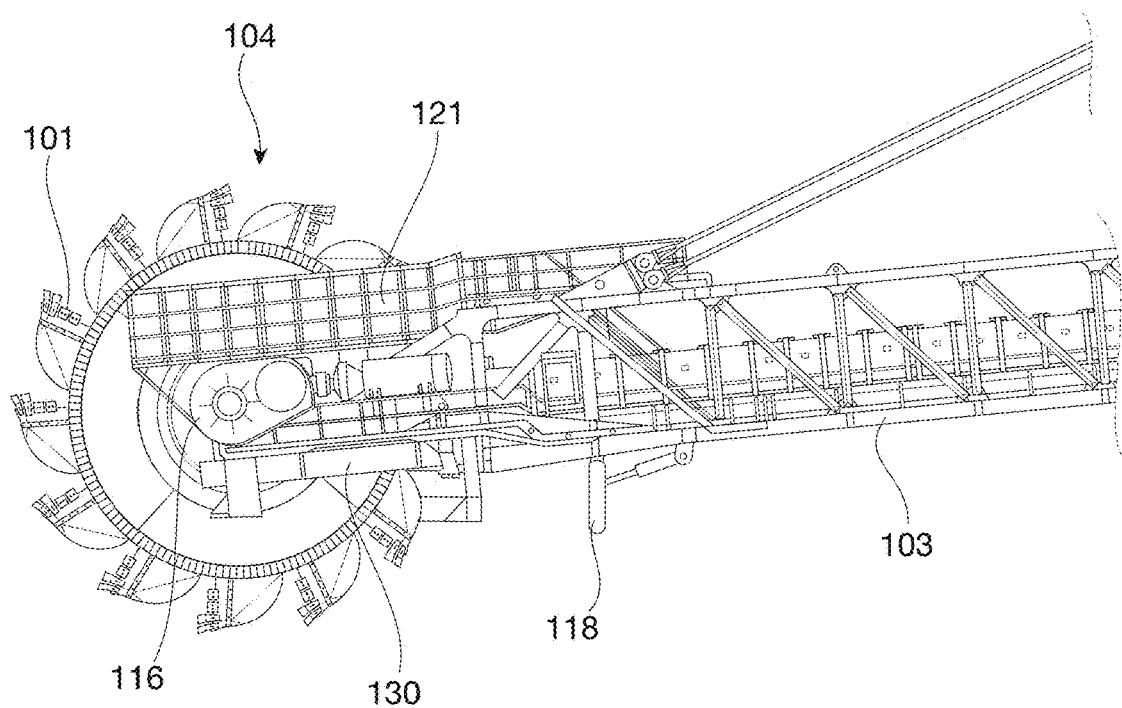
FIG. 3 shows a side view of an operating block of a bucket wheel machine according to one embodiment of the invention.
Figure 4:
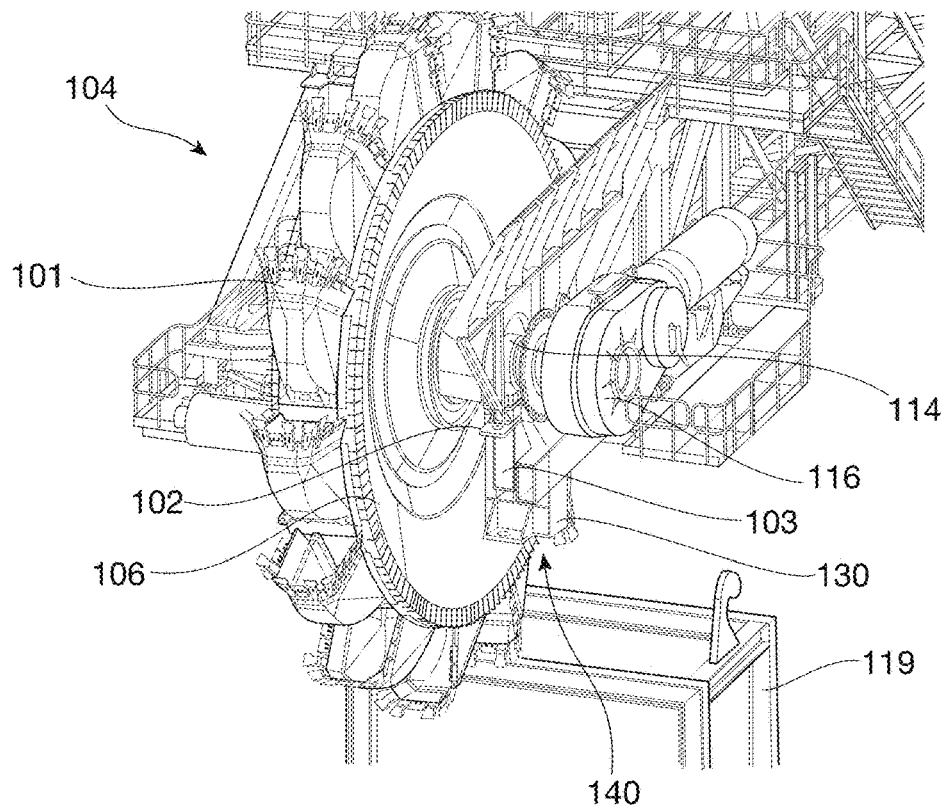
FIG. 4 shows a perspective view of an operating block of a bucket wheel machine according to one embodiment of the invention.

FIG. 3 and FIG. 4 shows the distal end of the boom 103 and the operating block 104 from the drive side of the operating block. Ballast engaging means 118 in the form of a substantially U-shaped loop is located below the boom 103. The ballast engaging means 118 is mounted on the boom 103 by means of a hinge which allows it to pivot around the hinge. The ballast engaging means 118 is coupled to a hydraulic piston located next to it, which allows it to be positioned in an active position and passive position. In the active position (FIG. 3) the ballast engaging means 118 is almost perpendicular to the boom 103 and is in suitable position for engaging with a corresponding engaging means e.g. the hook of a ballast weight, located below the boom. In the passive position (see FIG. 5), the ballast engaging means 118 is almost parallel with the boom 103.

The base 102 is shown in FIG. 4. A portion of the boom 103 in the form a beam, extends in the distal direction from the boom 103. The distal portion of the boom functions as the base for engaging with the bearing. The drive side bearing 114 is mounted on the base 102 and the the support frame 130 is mounted on the bearing next to it. The support frame 130 extends below boom and surrounds the distal portion of the boom, i.e. the beam. In other words, the support frame 130 forms an opening which is larger than the beam and which encircles the beam. A similar configuration exists on the chute side of the bucket wheel. A small gap exists below the beam, between the beam and the support frame 130. Assuming that any fastening means between the operating block 104 and the base 102 is disengaged, the operating block 104 may be moved slightly in an upwards direction relative to the boom 103. The operating block 104 may then be displaced in a distal direction whereby it is removed from the bucket wheel machine 100. The engaging and disengaging between the operating block 104 and base 102 is similar to how a pallet truck engage/disengage with a pallet.

The support frame 130 comprises one or more support areas 140 on the lower side of the support frame 130. In the embodiment shown the support area 140 is located below the bearing. This ensures that the contact between the support frame 130 and a support structure 132 occurs away from the bearing 112,114, drive 116, chute 118 and minimize the risk of causing any damage to these components during removal/installation of the operating block 104.

Figure 5:
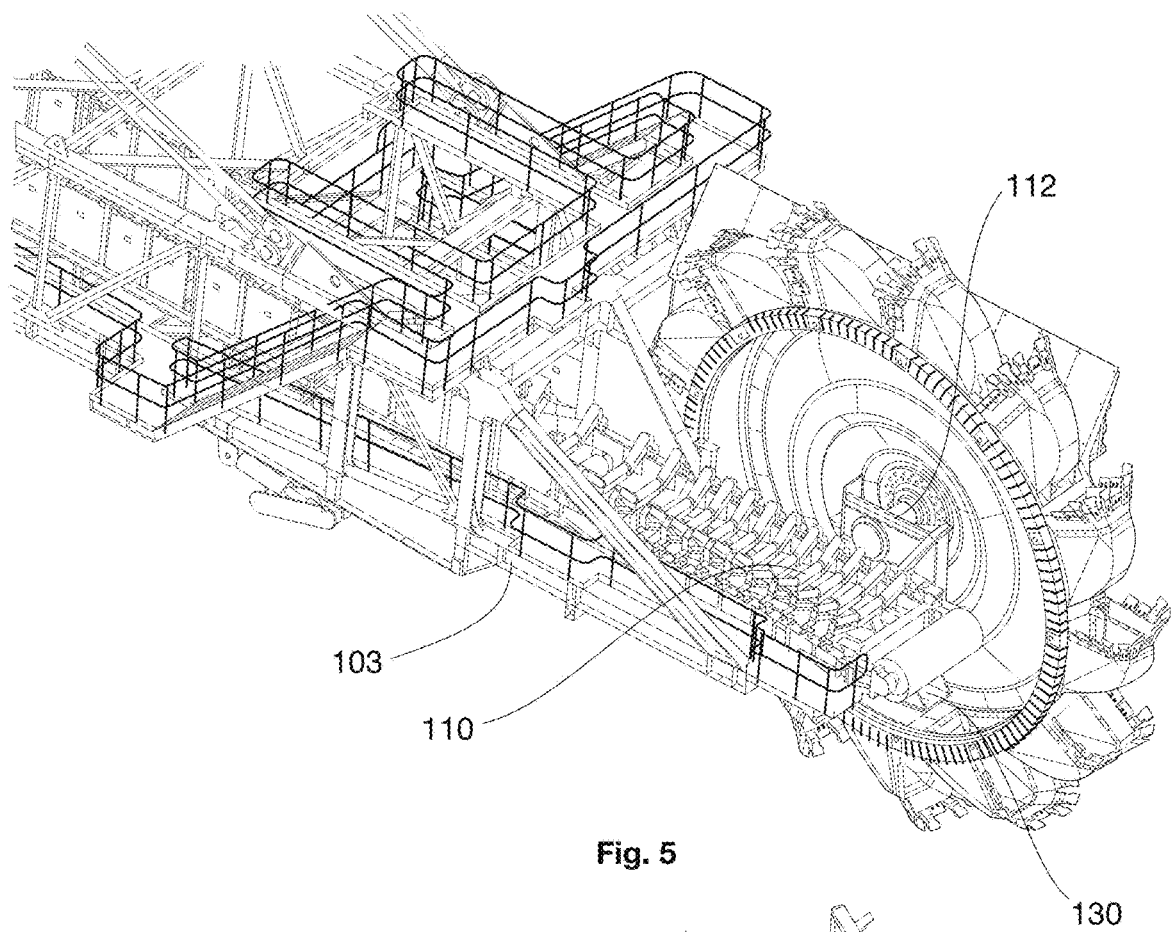
FIG. 5 shows another perspective view of an operating block of a bucket wheel machine according to one embodiment of the invention.

FIG. 5 shows the distal end of the boom 103 and the operating block 104 in greater detail from the chute side of the operating block. The bucket wheel chute 108 has been hidden in this figure to show the bearing 112 in greater detail. As in the drive side, a portion of the boom 103 in the form of a beam extends towards the bearing. The distal end of the beam functions as the base (not shown), to engage with the operating block 104. A first part of the conveyor 110 extends towards the distal end of the operating block 104 to transport material supplied by the bucket wheel chute 108 towards to main structure 136

Figure 6:
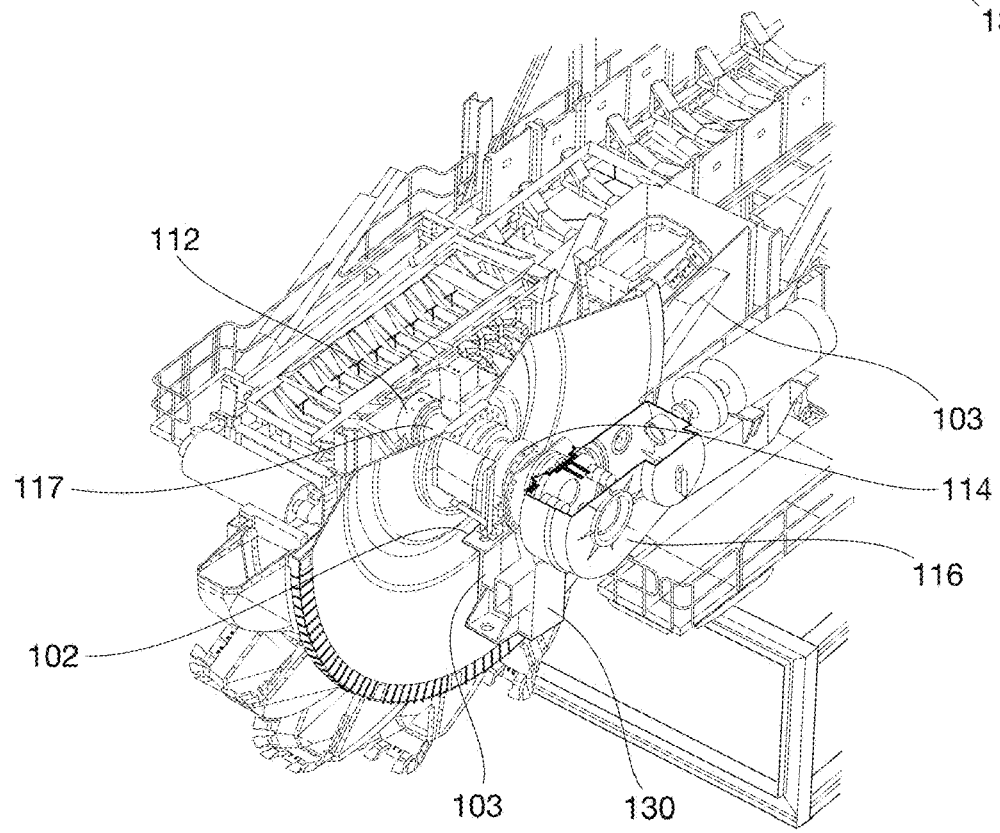
FIG. 6 shows a sectional view of a base and bearings of an operating block according to an embodiment of the invention.

FIG. 6 shows a sectional view of the operating block 104 where the components in a plane above the bearing is hidden. The shaft 117 is rotatably attached to the chute side bearing 112 and the drive side bearing 114. The shaft 117 extends through the drive side bearing 114 into the drive 116. The bucket wheel 106 is attached to the shaft and is located between the bearings 112 and 114.

Figure 7:
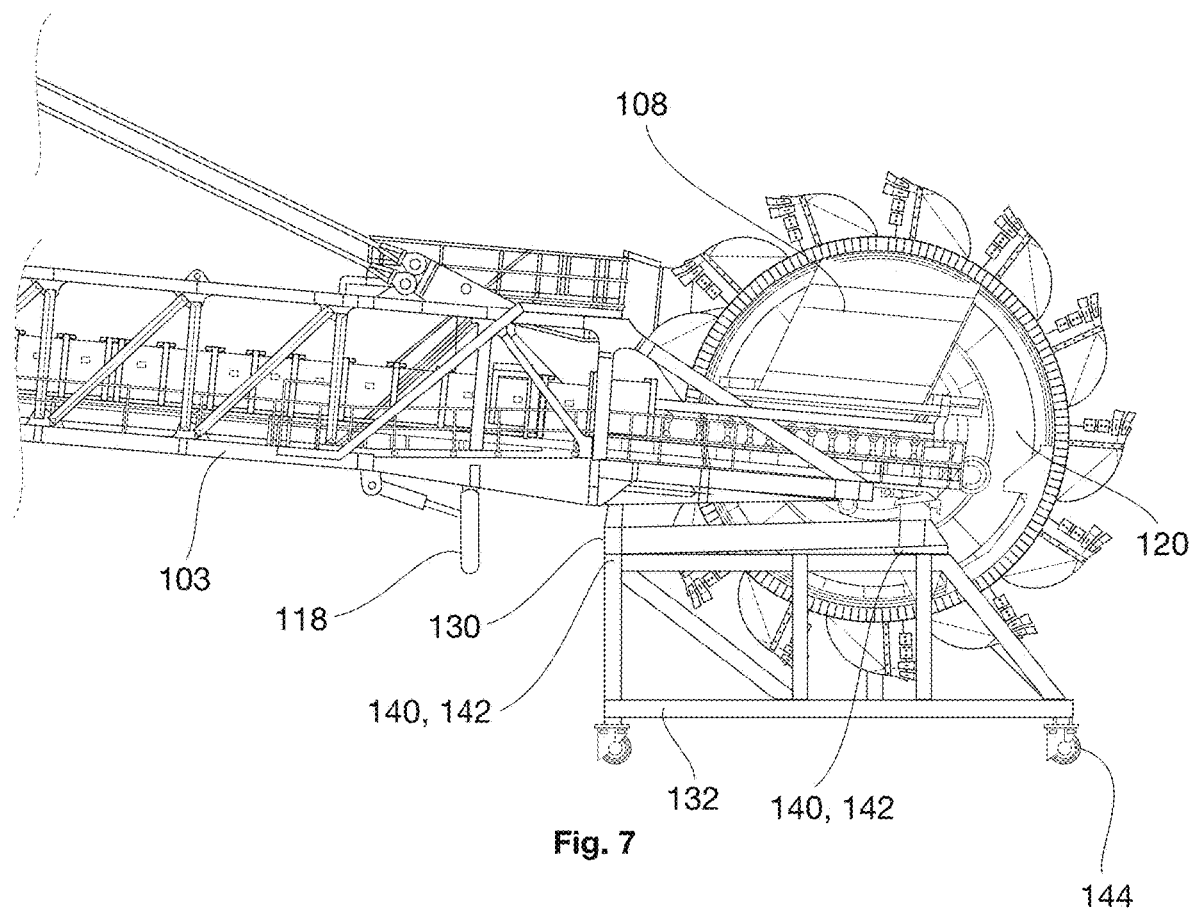
FIG. 7 shows a side view of an operating block connected to the boom of a bucket wheel machine and a support structure according to an embodiment of the invention.
Figure 8:
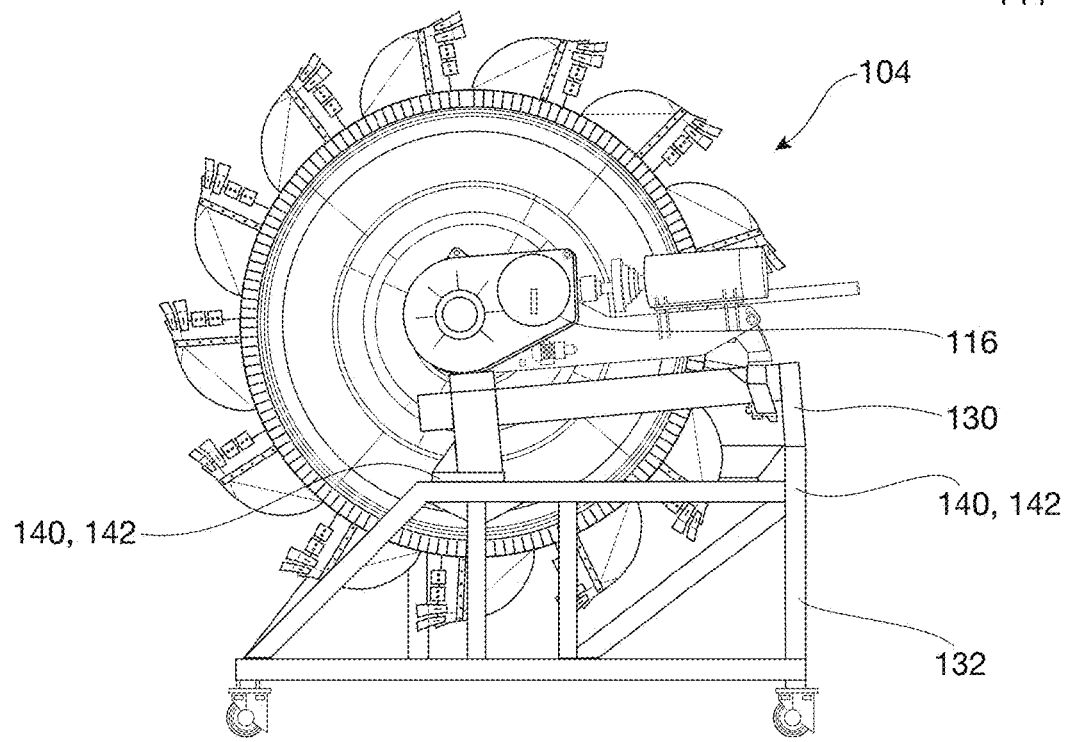
FIG. 8 shows a side view of an operating block according to an embodiment of the invention supported by a support structure.

FIG. 7 shows a bucket wheel machine system including the bucket wheel machine 100 and a support structure 132. The support structure 132 is adapted for supporting the weight of the operating block 104 and has a receiving surface 142 located in an upper part of the support structure to contact the support area 140 of the support frame 130. In the embodiment shown, the receiving surface 142 is substantially horizontal. This is suitable for engaging with the support area 140 of the support frame 130 which in this embodiment is in a substantially horizontal position when lowered onto the support structure 132. The support structure is configured such that when the support frame 130 (i.e. the operating block) is placed on the receiving surface 142 the bucket wheel 106 do not touch the ground. Alternatively, the receiving surface 142 of the support structure 132 and the support area 140 of the support frame 130 may have mutually corresponding surfaces other than a planner surface, such as protrusions/recess' and/or inclined surfaces. In the embodiment show in FIG. 7, FIG. 8, and FIG. 10 the support structure 132 is adapted for moving by means of wheels attached to the bottom of the support structure 132.

Figure 10:
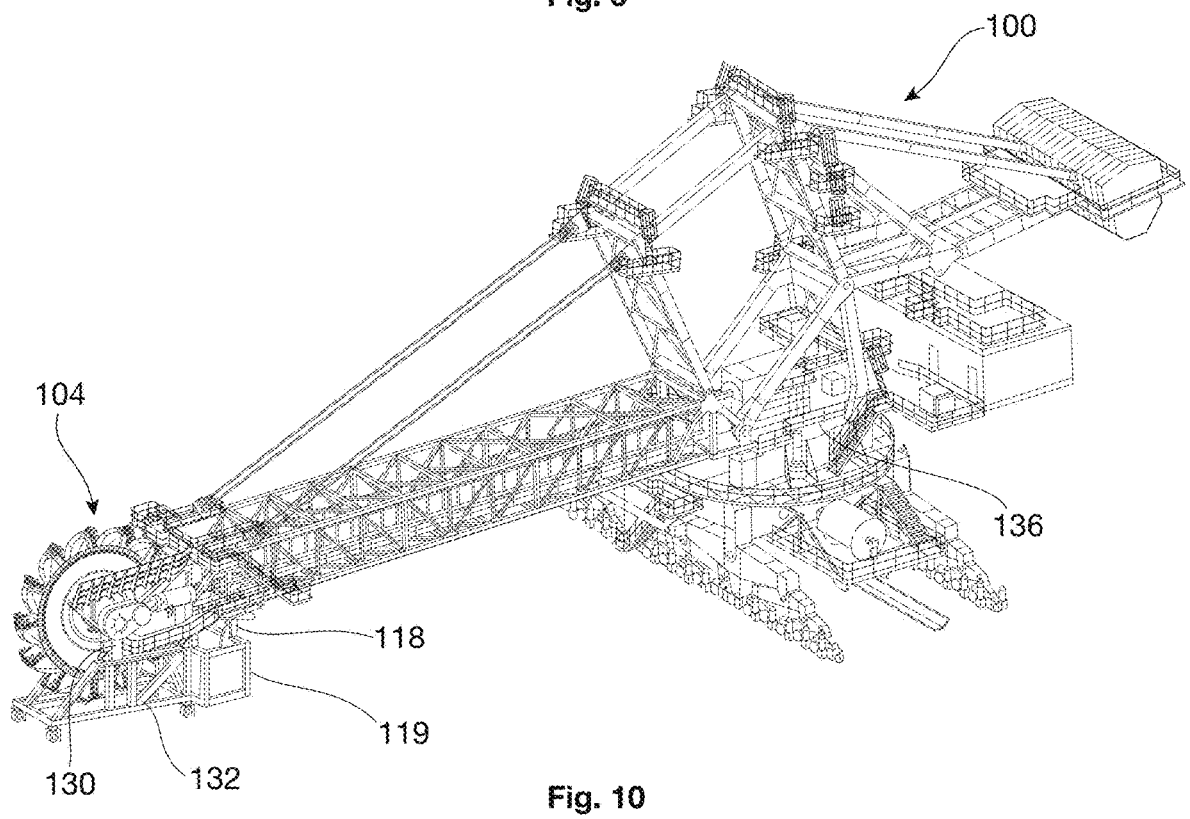
FIG. 10 shows a perspective view of bucket wheel machine, a ballast weight and a support structure according to one embodiment of the invention.

As shown in FIG. 10 the system may also include a ballast weight 119. The ballast weight 119 has engaging means which are mutually corresponding to the the ballast engaging means 118 located on the boom 103. In the specific embodiment the ballast weight is a block of cement which may be lifted by the bucket wheel machine 100. Alternatively, the ballast weight may be a fixed structure such as a cast foundation, a foundation pill or the like.

Figure 9:
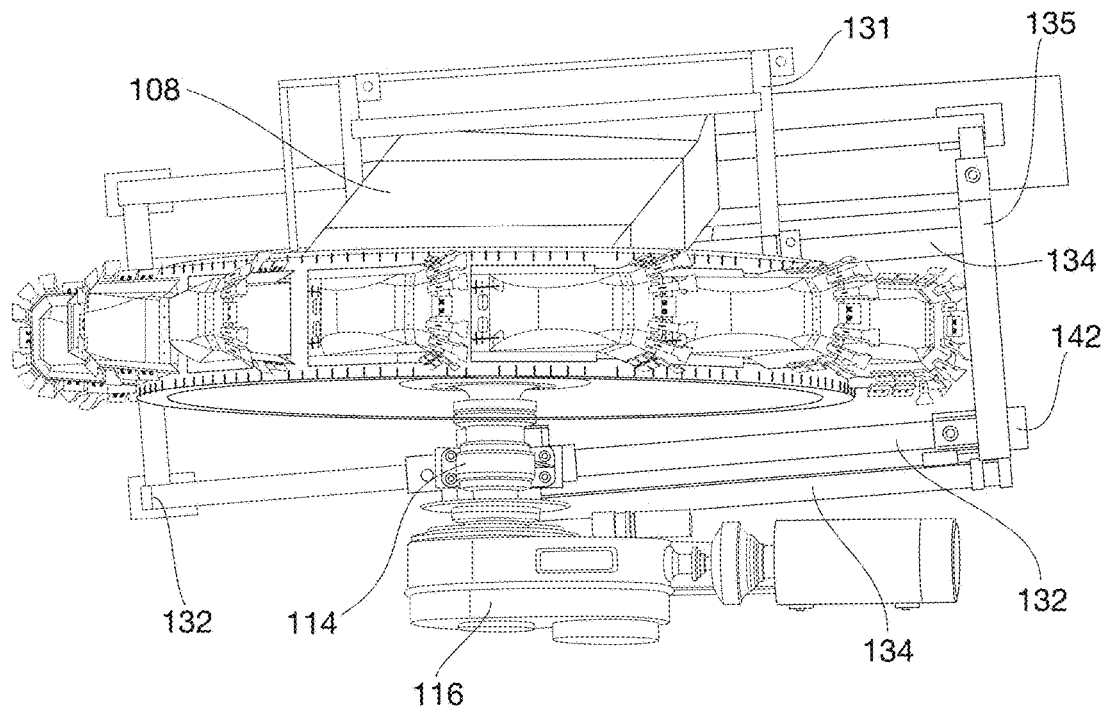
FIG. 9 shows a top view of an operating block according to an embodiment of the invention supported by a support structure

FIG. 9 shows an embodiment of the invention in which the operating block 104 is detached from the bucket wheel machine 100 and rests on the support structure 132. The support frame 130 in this embodiment has, when seen from above, a U-shape and consists of two parallel bars 134 and a cross bar 135. The parallel bars 134 is attached to the bearings 112 and 114 and extends from below the bearings 112, 114 towards the proximate end of the operating block 104. The cross bar 135 is attached between the parallel bars 134 at a distance from the bearings 112, 114, such that the buckets 101 of the bucket wheel 106 do not catch on the frame, i.e. the bucket wheel 106 may be rotated while supported on the support structure 132. The support structure 132 has, when seen from above, a rectangular shape. This design allows at least 4 engaging surfaces between the support frame 130 and the support structure 132; one below each bearing 112, 114 and one at each corner of the U-shape (where the parallel bars 134 and the cross bar 135 meets).

In the specific embodiment shown, the majority of the cross bar 135 rests on the support structure 132. On the chute side of the bucket wheel 106, the support frame 130 has a chute supporting frame 131, which stabilizes the chute once removed from the bucket wheel machine 100. The receiving surfaces 142 may be provided with receiving holes (not shown) for positioning pins of the bearings 112, 114. As one can see from the illustration of FIG. 7 to FIG. 10, the support platform 132 is arranged such that the operating block 104 may be received therein in such manner that it is accessible to, for example, maintenance personal. Because the support frame 130 supports the operating block 104 through the bearings 112, 114, the other components such as the buckets 101, bucket wheel chute 108, ring chute 120, and drive 116 can easily be removed.

Figure 11A:
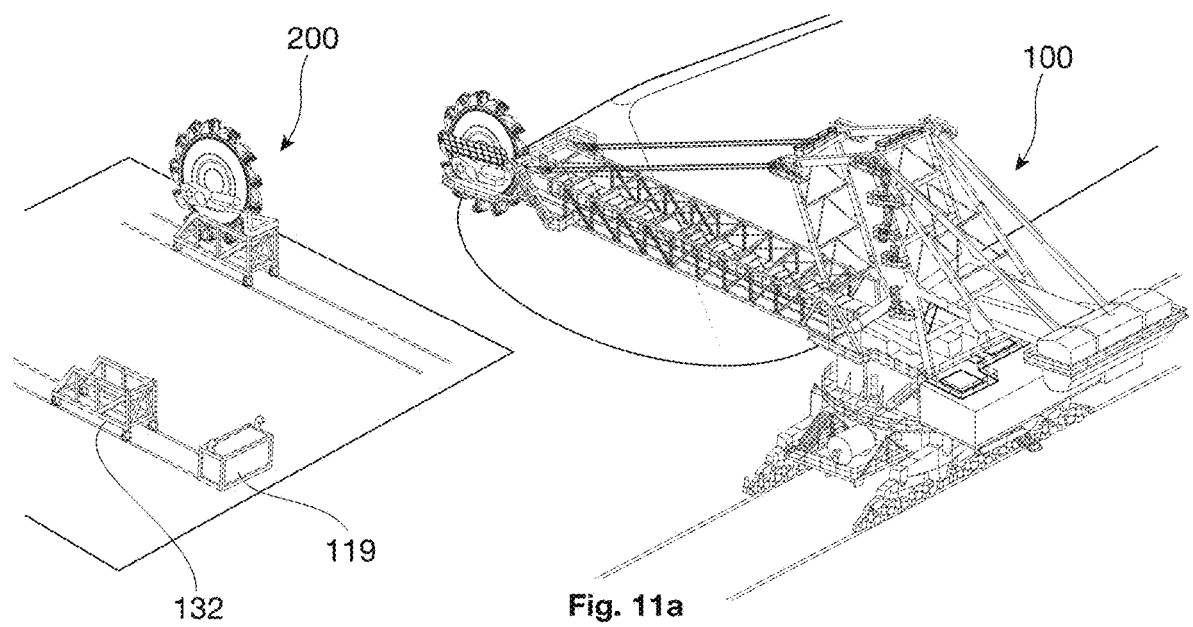
FIG. 11a to FIG. 11v show a method of removing and replacing an operating block of a bucket wheel machine according to an embodiment of the invention.
Figure 11B:
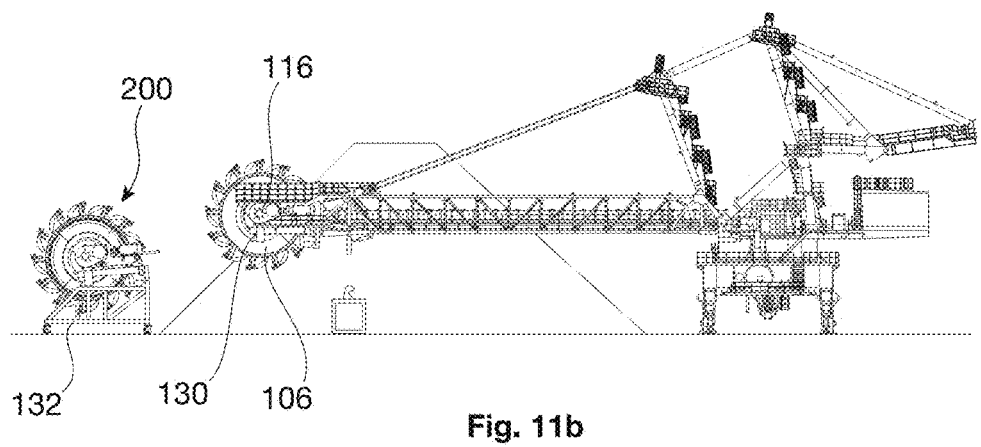
Figure 11C:
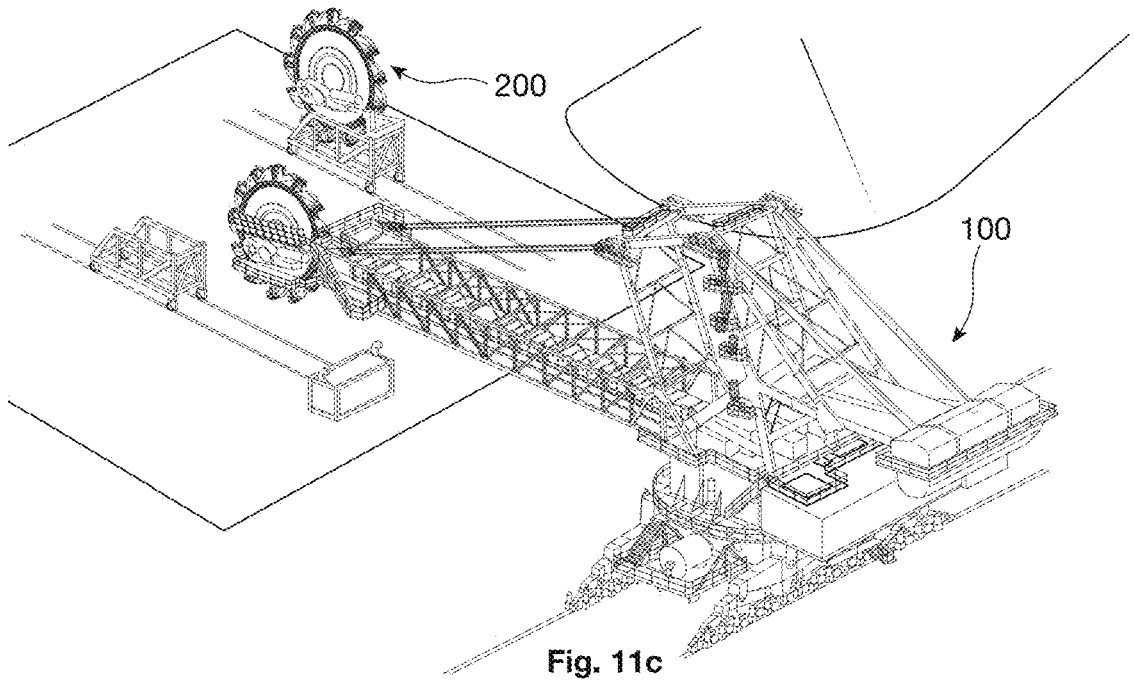
Figure 11D:
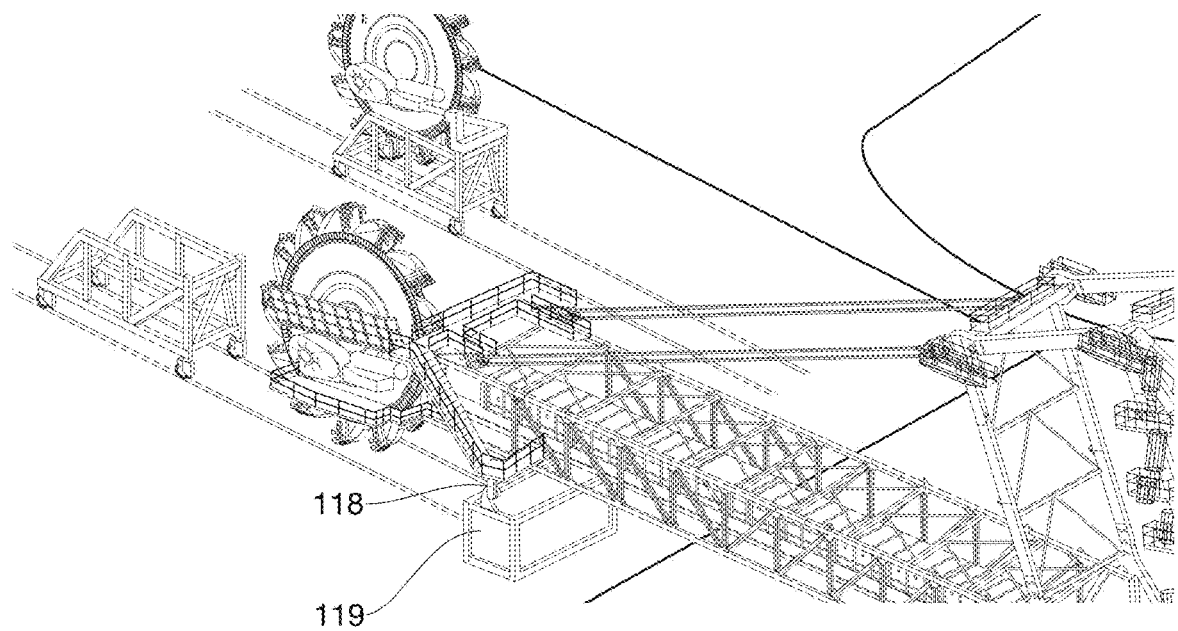
Figure 11E:
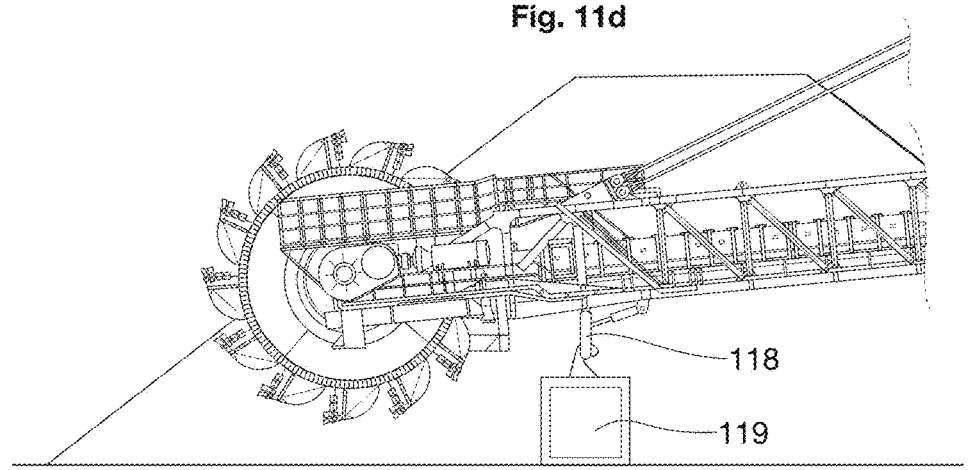
Figure 11F:
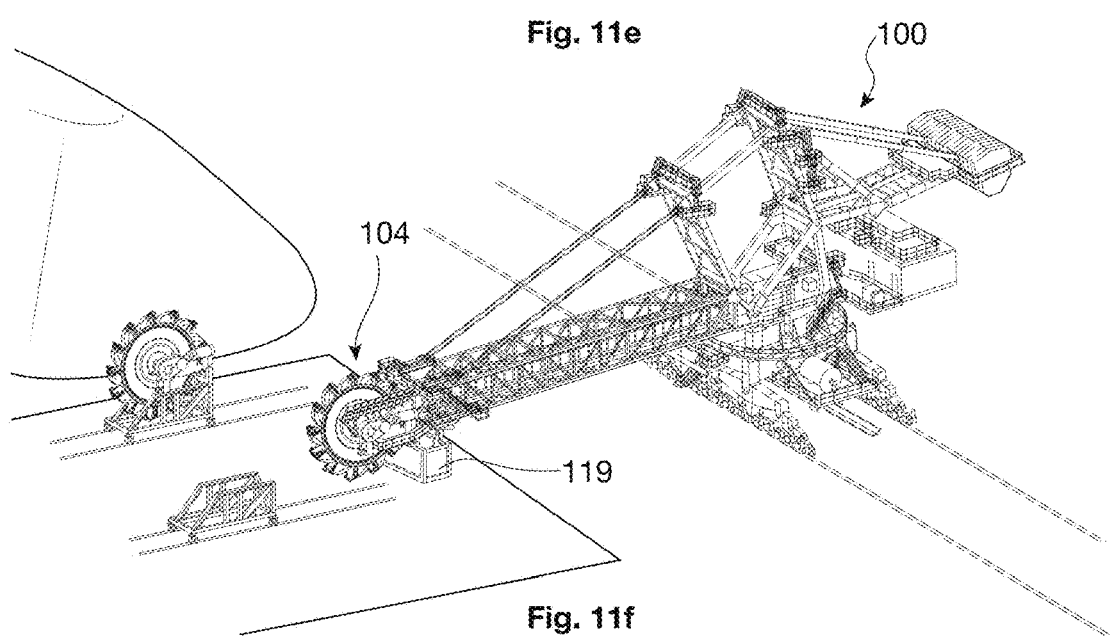
Figure 11G:
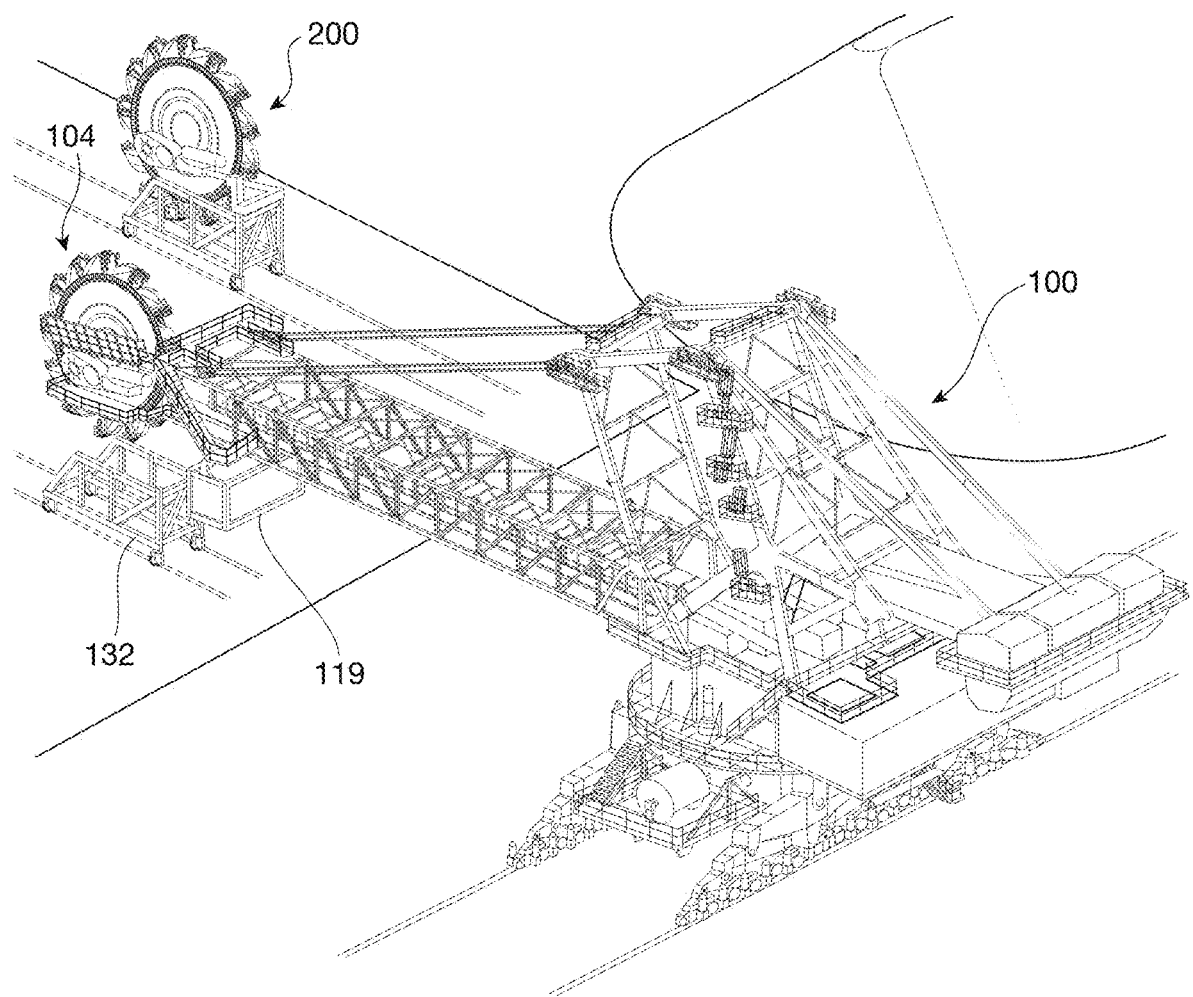
Figure 11H:
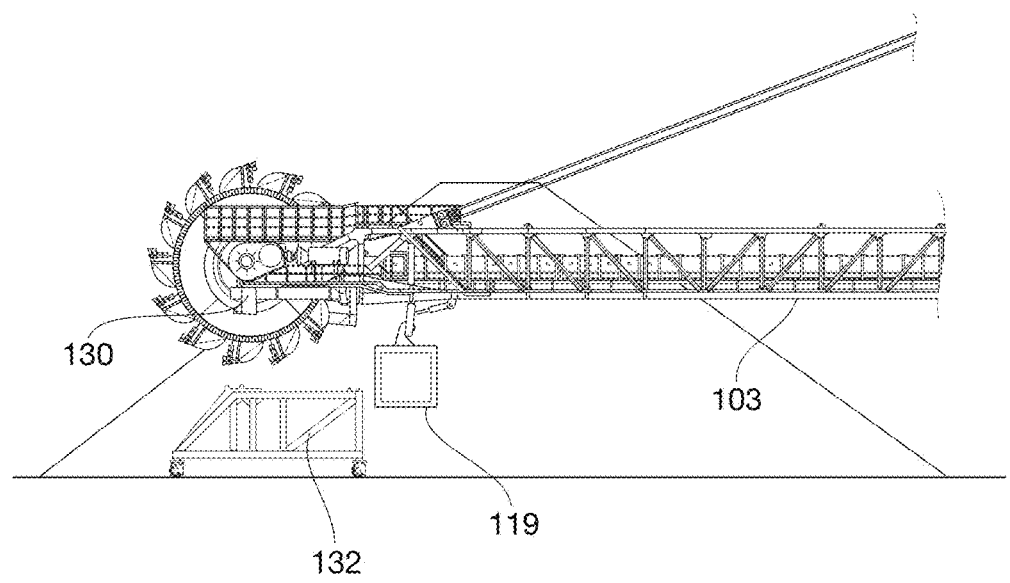
Figure 11I:
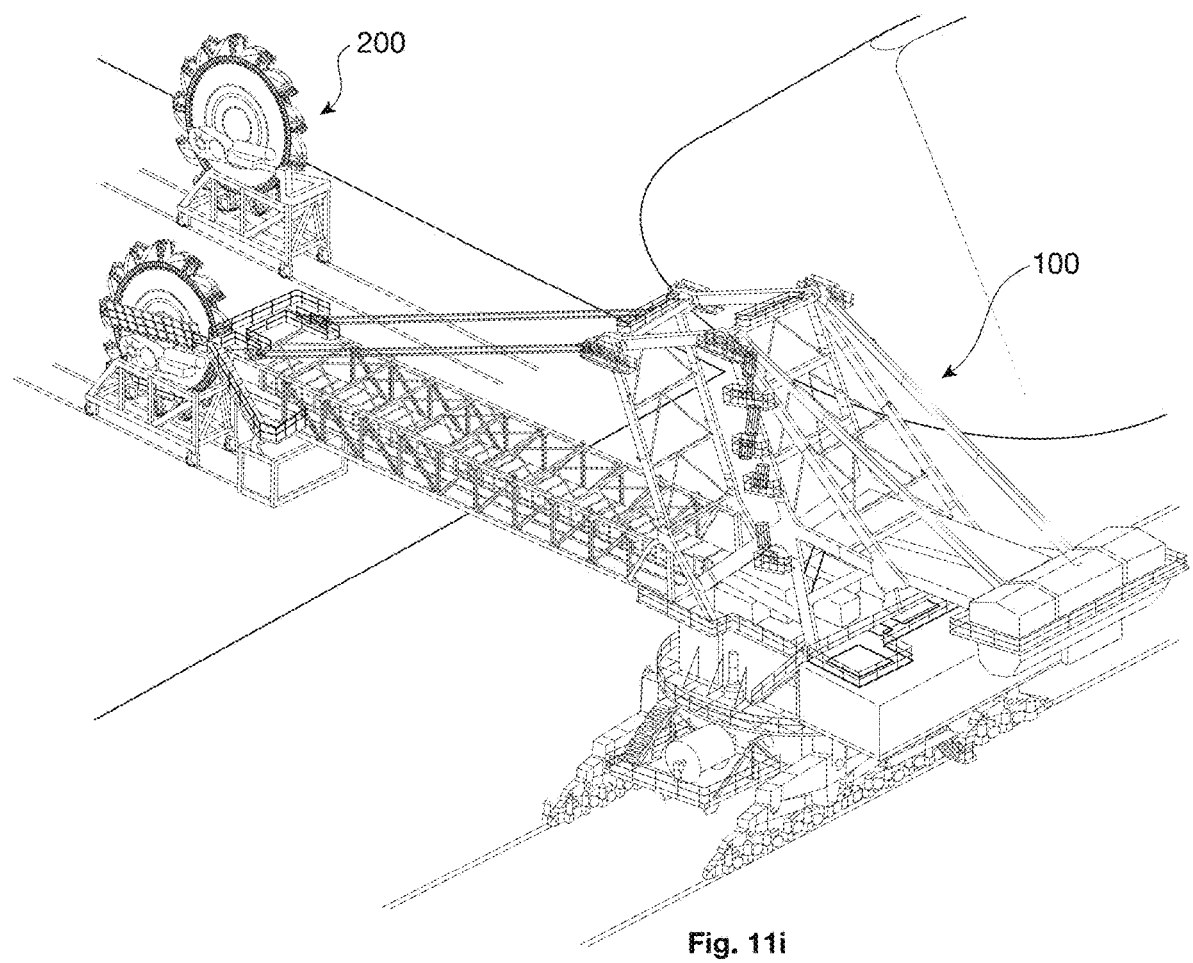
Figure 11J:
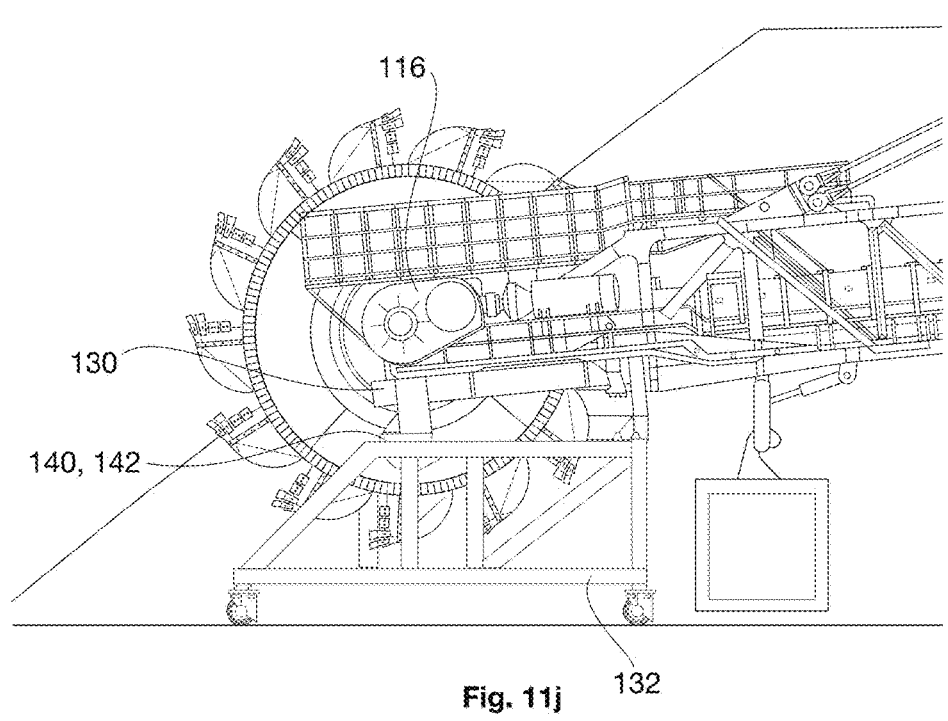
Figure 11K:
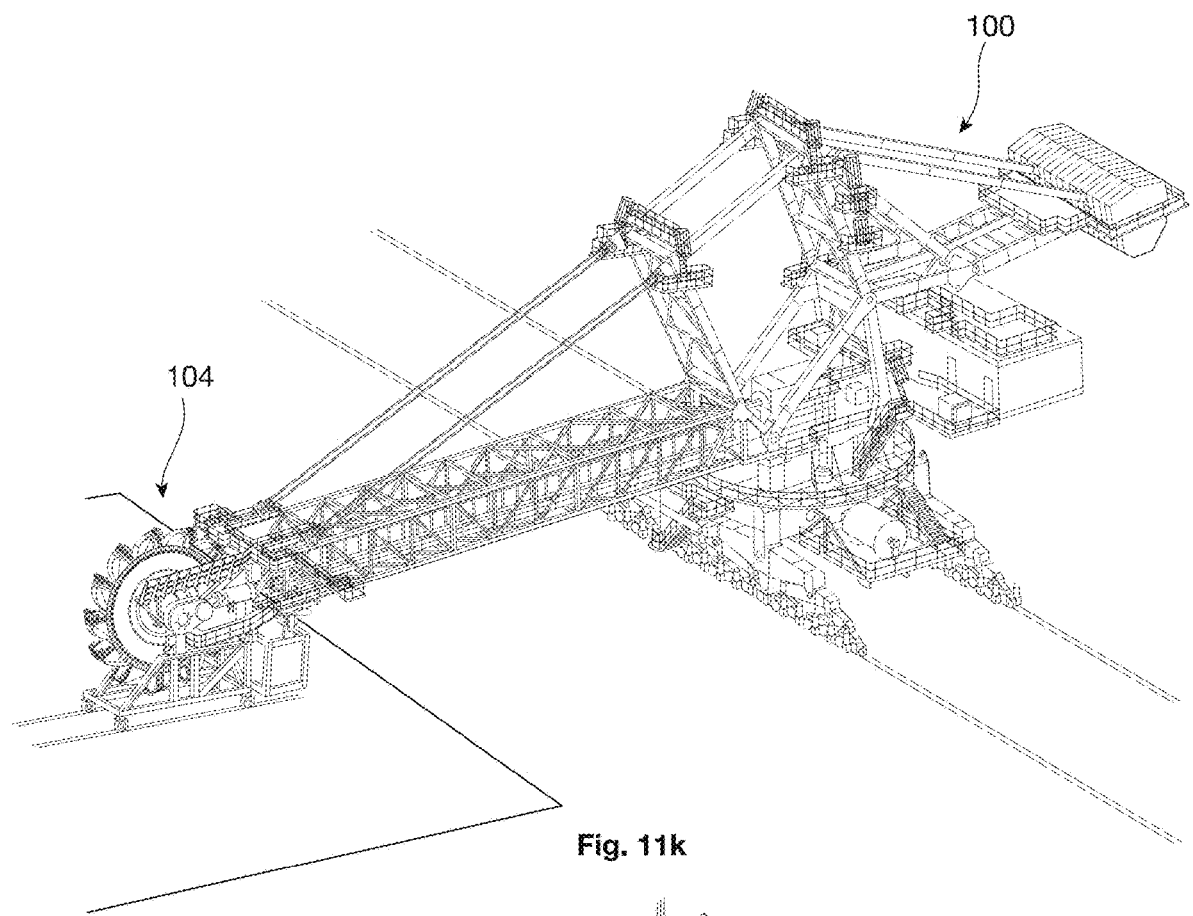
Figure 11L:
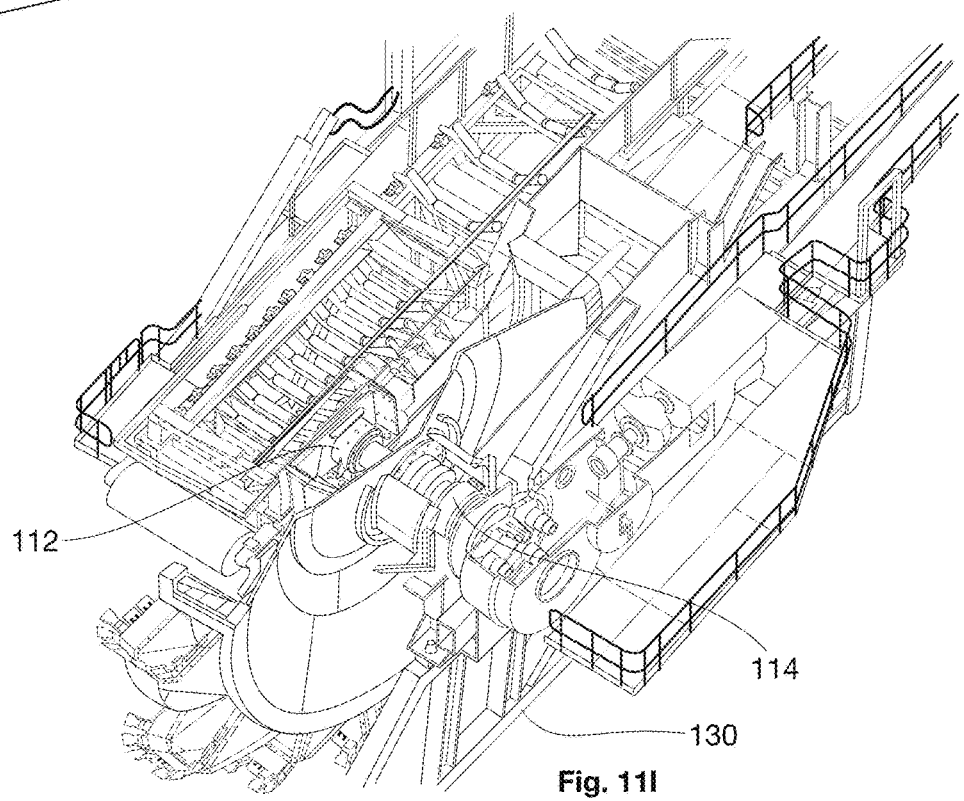
Figure 11M:
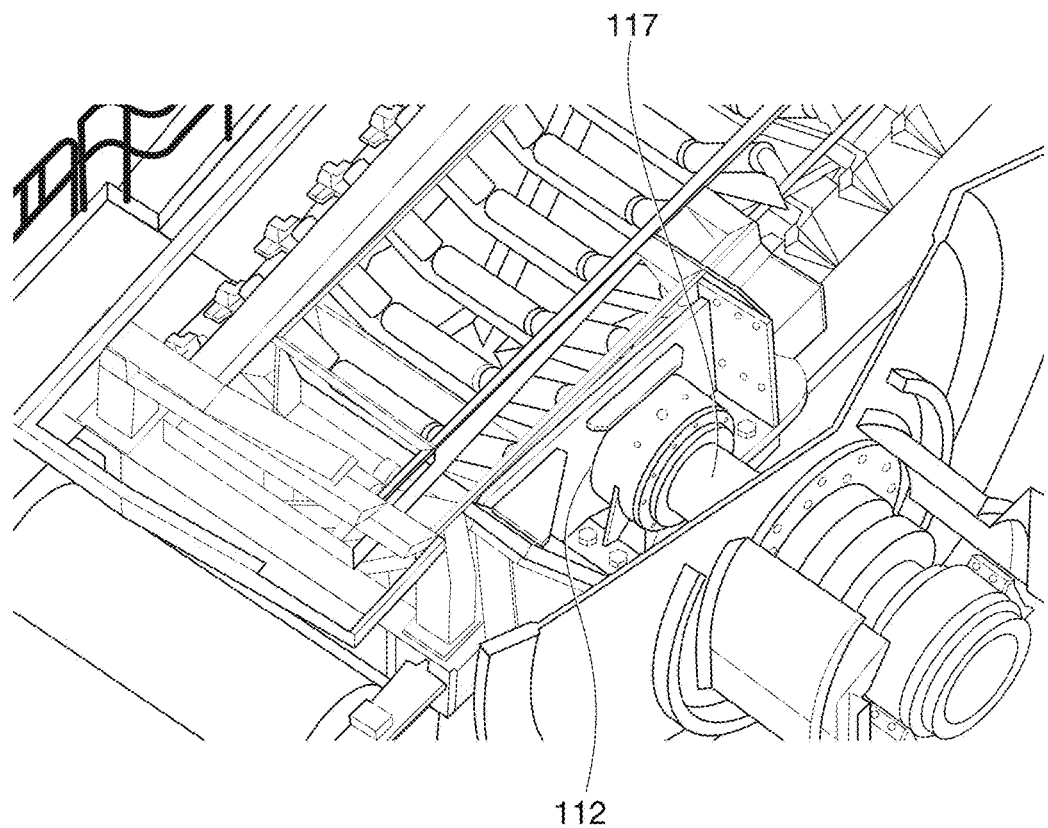
Figure 11N:
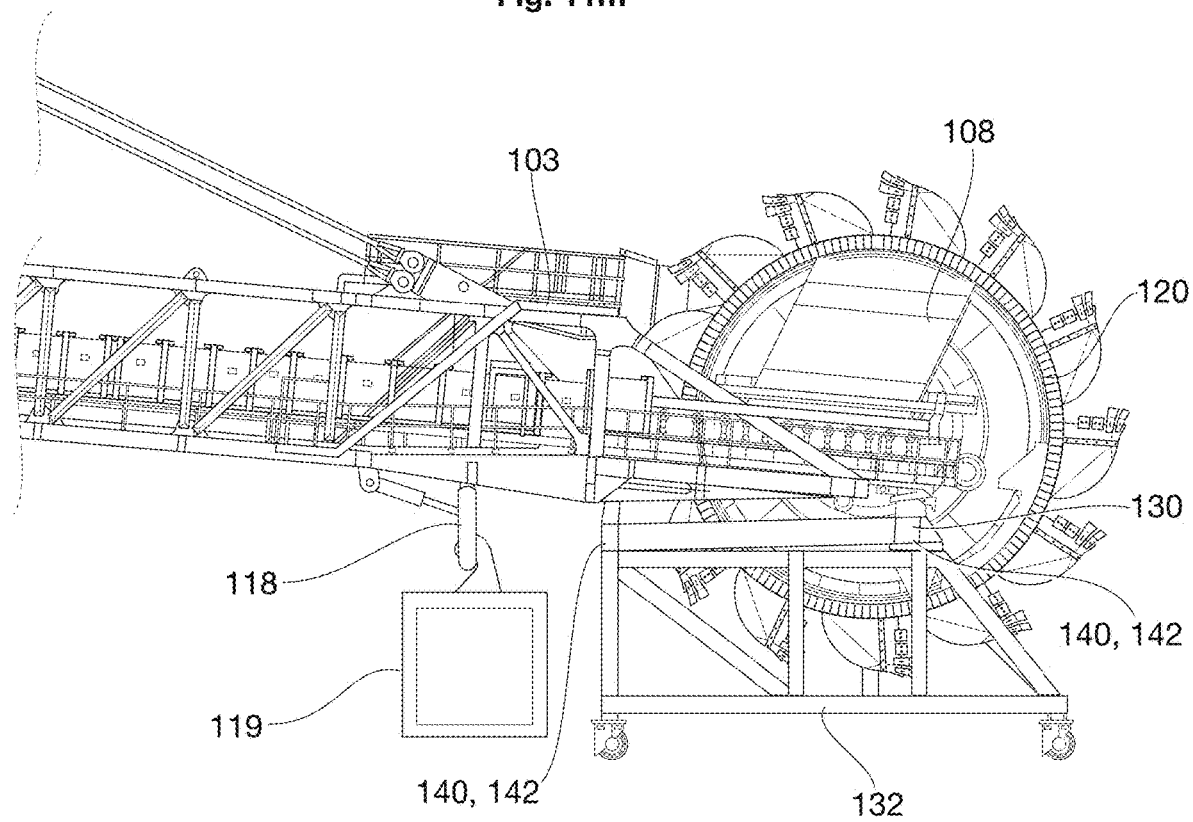
Figure 11O:
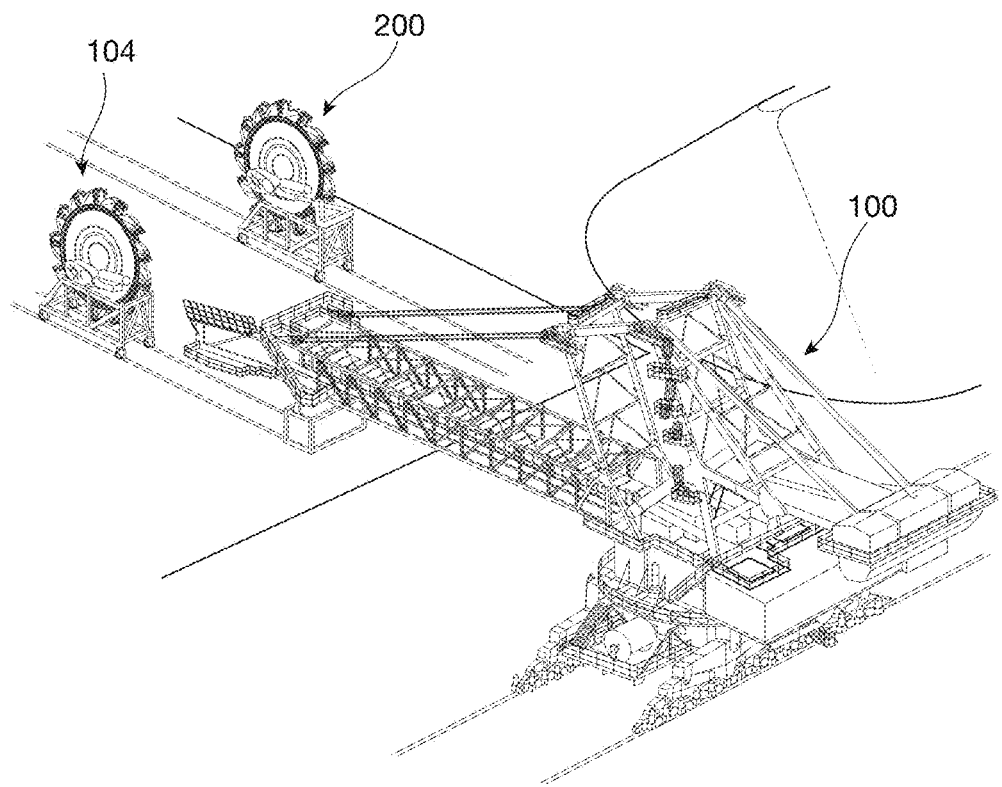
Figure 11P:
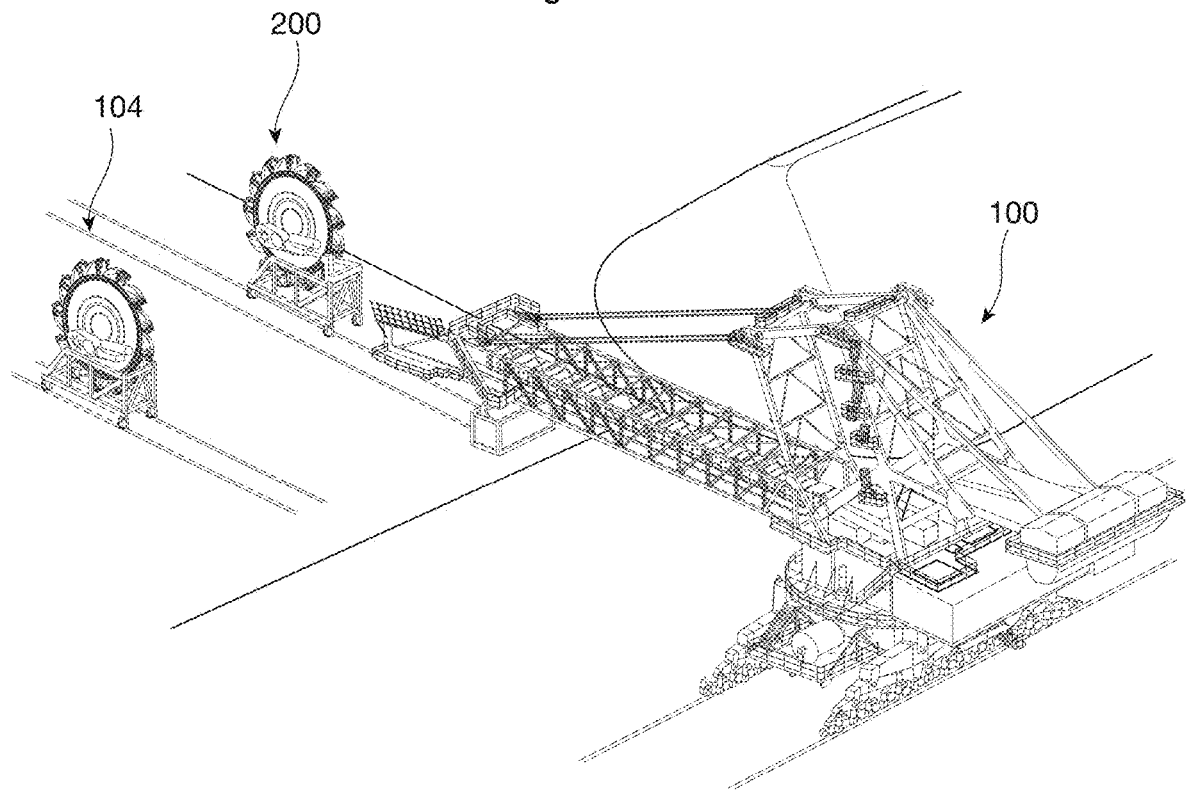
Figure 11Q:
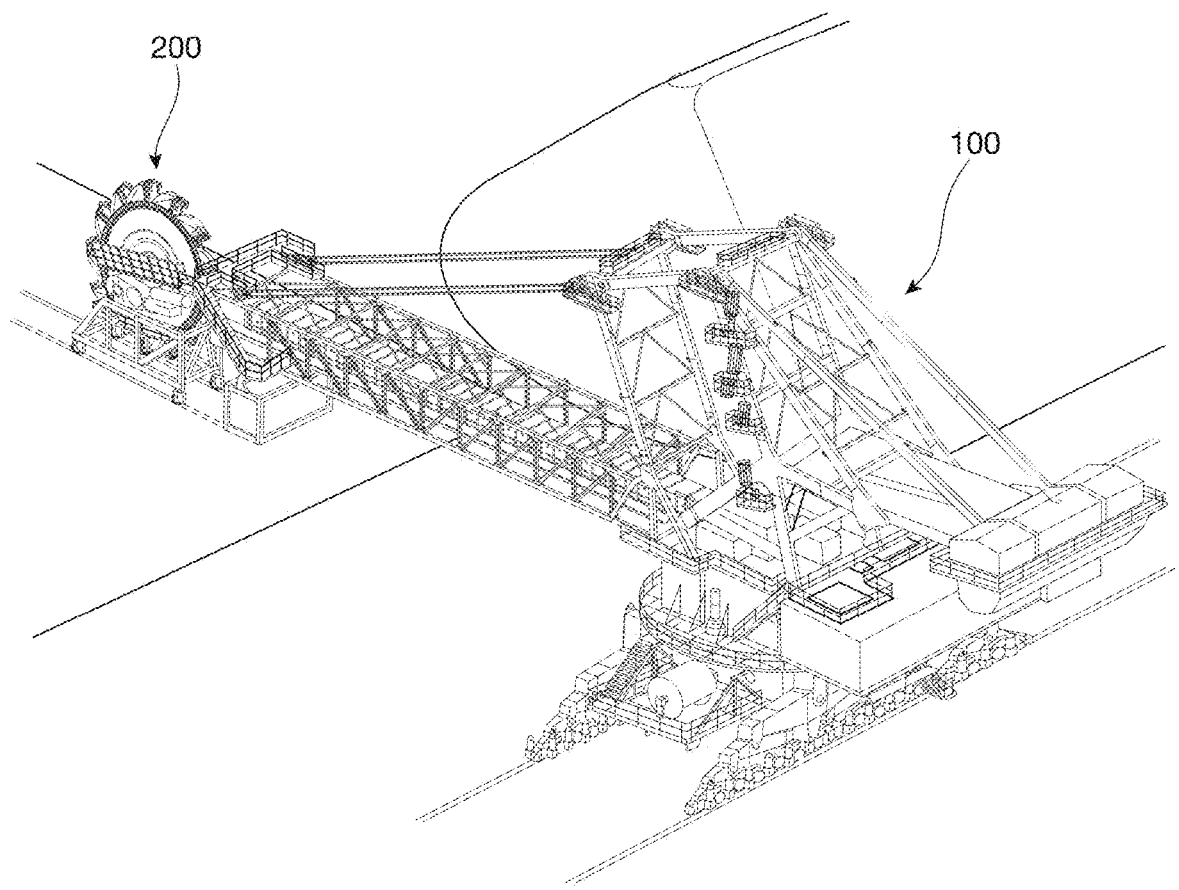
Figure 11R:
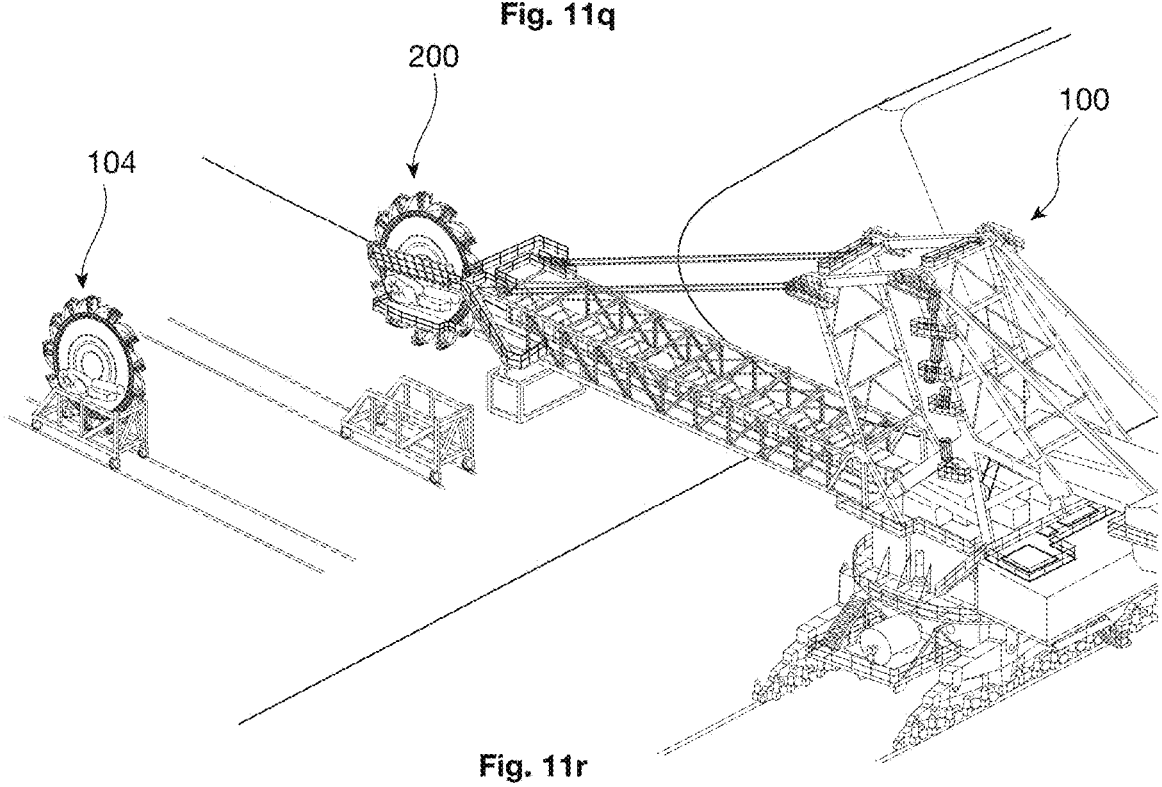
Figure 11S:
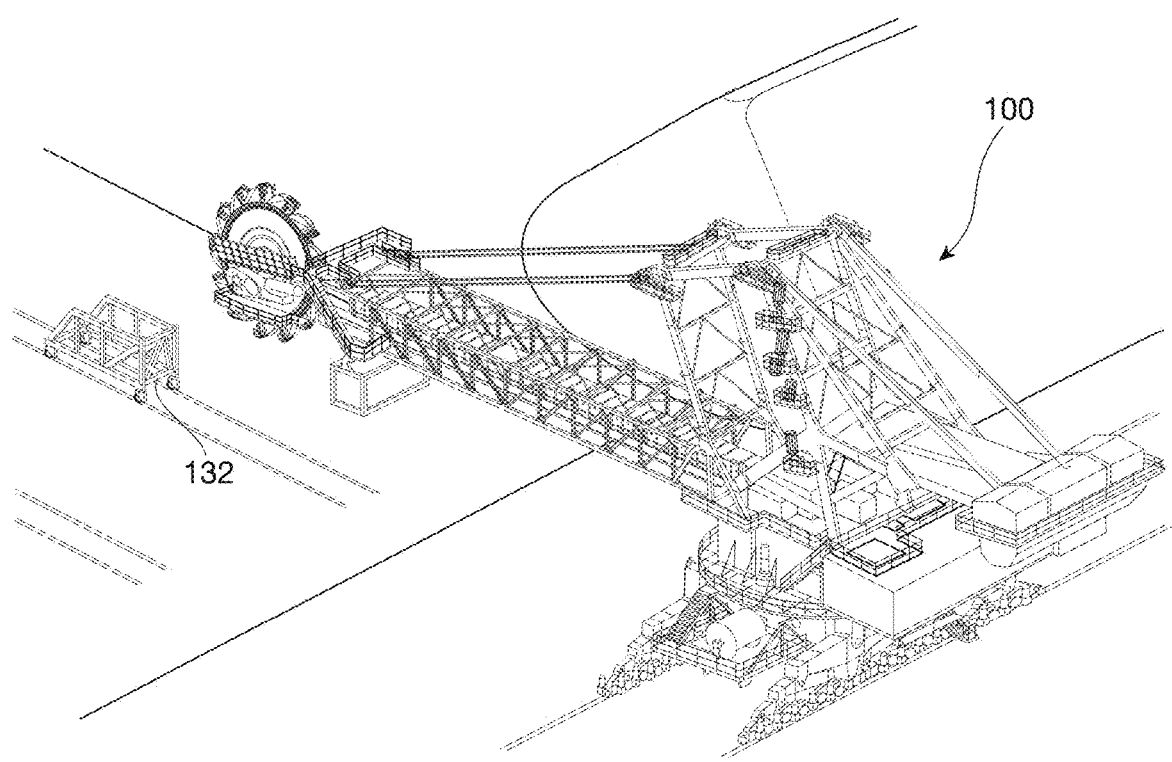
Figure 11T:
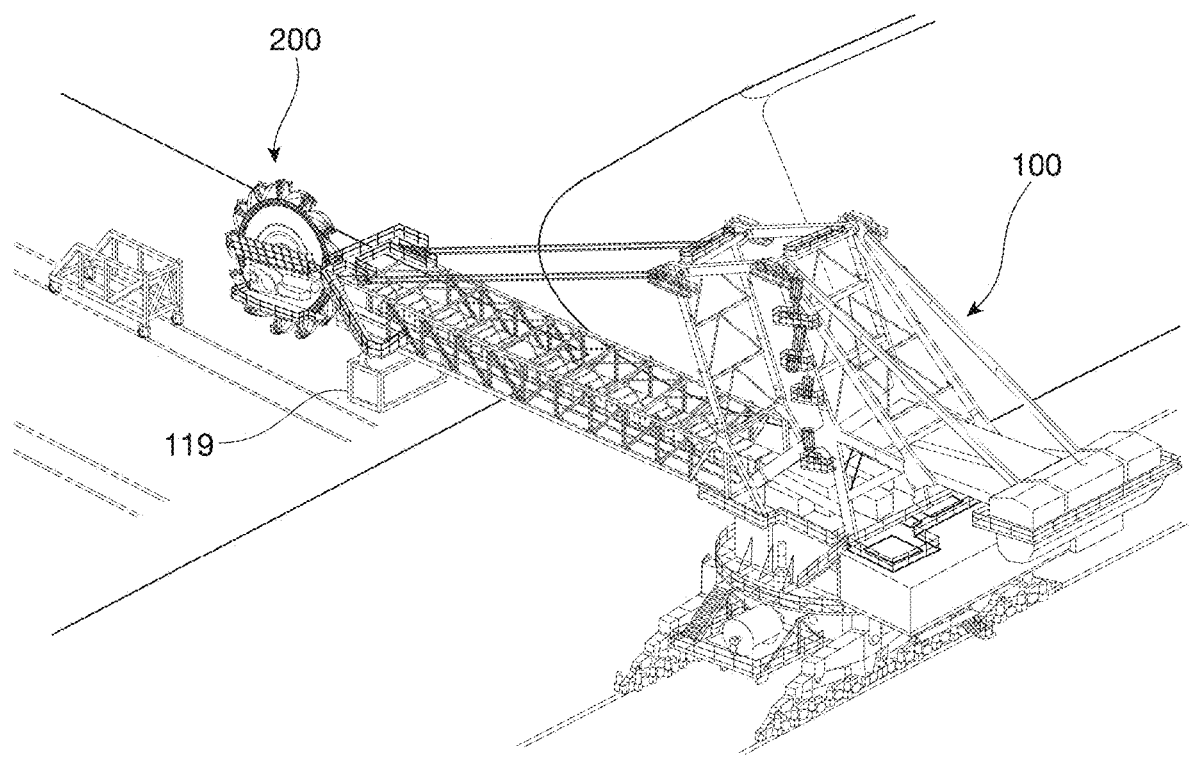

FIG. 11a to FIG. 11t show the required steps of providing a change out of the operating block 104 according to one embodiment of the invention.

In FIG. 11a the bucket wheel machine 100 is driven to a maintenance area comprising a replacement operating block 200 located on a support structure, an empty support structure 132, and a ballast weight 119. The support structures have train wheels and can be moved on sets of rails.

In FIG. 11b and FIG. 11c the bucket wheel machine 100 is aligned with the ballast weight 119 and the boom is lowered so the ballast engaging means 118 approximates the ballast weight 119.

In FIG. 11d and FIG. 11e the ballast weight 119 is connected to the boom 103. The ballast engaging means 118 is connected to two anchors located in the ballast weight. The anchors may be exchanged with longer or shorter anchors. This is done to adjust the height between the ground and the bottom of the bucket wheel 106 when the ballast weight 119 is attached to the boom 103 but is resting on the ground.

In FIG. 11f the boom 103 including the ballast weight 119 is lifted up.

In FIG. 11g and FIG. 11h the empty support structure 132 is moved to a position below the operating block 130. The boom 103 is then slowly lowered to contact the support area 140 of the support frame 130 with the receiving surface 142 of the support structure 132. During the lowering of the boom the support structure 132 may be move away or towards to bucket wheel machine to align the support area 140 and the receiving surface 142.

In FIG. 11i to FIG. 11k the support area 140 and receiving surface 142 is contacted. The boom 103 is lowered until a certain pressure change at the luff system is detected. The pressure change indicates that the operating block 104 is supported by the support structure 132. The operating block 104 may then be disconnected from the bucket wheel machine 100.

FIG. 11l shows a perspective view of the operating block in which the 'bearing-support frame' connections and the 'bearing-base' connections can be seen. FIG. 11m shows an enhanced figure of the chute side bearing. All electrical, lubrication, hydraulic and water lines between the operating block 104 and bucket wheel machine 100 have to be disconnected for removing the operating block 104. The bearings 112 and 114 are during a mounted condition resting on the base 102. As shown in FIG. 11m 4 bolts is used as fastening means between the bottom of the bearing 112 and the base 102. Similarly, 4 bolts are used in the opposite site of the bucket wheel 106, to fasten the drive side bearing 114 to the base 102. The bolts may e.g. be M24 to M64 Hex head bolts. The sides of the bearing 112 is attached and fastened to the support frame 130. In the specific embodiment 10 pieces of M30 Hex Head bolts are used as fastening means. In the drive side bearing 114, 4 pieces of M56 HEX head bolts are used as fastening means between the support frame 130 to the bearing 114. These fastening means are merely mentioned as examples. Selecting proper fastening means for fastening the operating block 104 and bearings 112 and 114 is within the knowledge of the skilled person.

FIG. 11n shows an embodiment of the invention in which all connections between the operating block 104 and bucket wheel machine 100 has been disconnected. The boom may be further lowered to make the operating block 104 sit/rest on the support structure 132.

As shown in FIG. 11o the support structure 132 including the operating block 104 can be removed from the bucket wheel machine 100 by moving it in a direction away from the bucket wheel machine. The bucket wheel machine 100 is now without an operating block 104 and is kept in balance by the ballast weight 119.

FIG. 11p shows the bucket wheel machine including the ballast weight 119 moving to a second location in the maintenance area and aligning with a replacement operating block 200. The replacement operating block 200 may be a new or refurbished operating block.

In FIG. 11q the replacement operating block 200 is moved towards the bucket wheel machine 100. As the replacement operating block is displaced towards the bucket wheel machine 100, the distal end of the boom 103 is placed below the bearing 112 and 114 and is encircled by the opening (not shown) in the support frame 130. The boom is lifted until a certain pressure change is detected in the luff system, i.e. the bearing 112 and 114 contacts the base of the bucket wheel machine 102 and the weight of the operating block is transferred from the support frame 132 to the bucket wheel machine 100. Any fastening means and connections between the operating block 104 and bucket wheel machine can be connected/closed.

As can be seen in FIG. 11r the bucket wheel machine 100 may now securely lift the replacement operating block 200 from the support structure 132. The empty support structure 132 may be moved away from the bucket wheel machine 100 as shown in FIG. 11s.

Figure 11U:
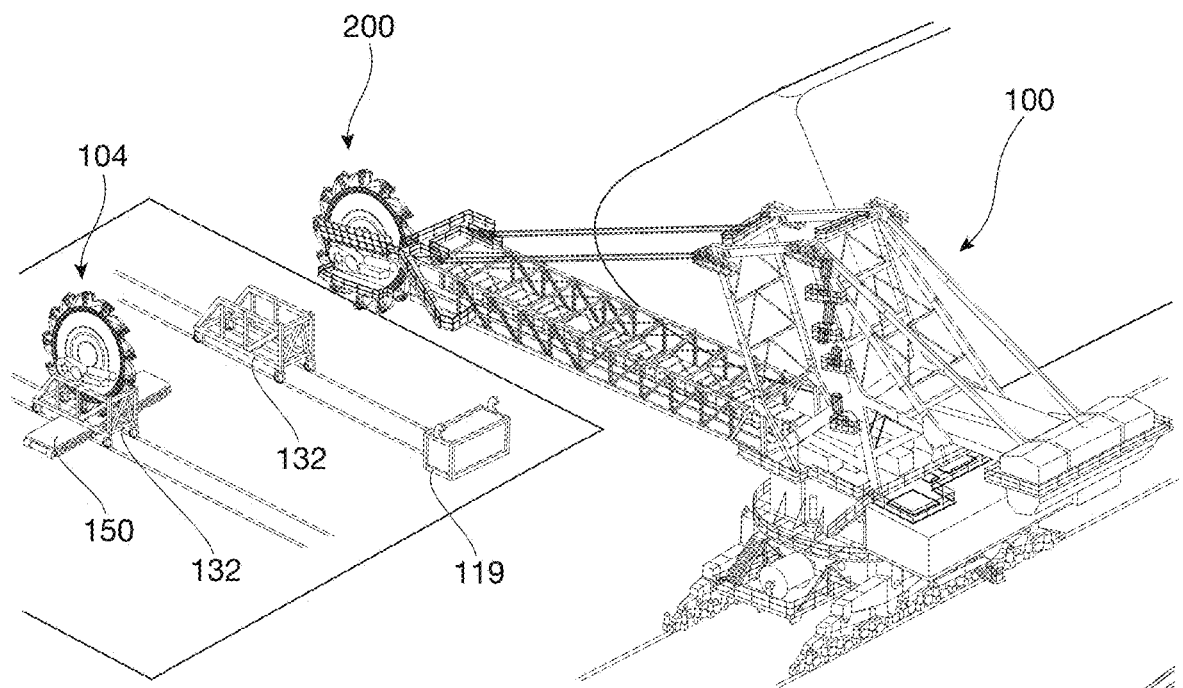
Figure 11V:
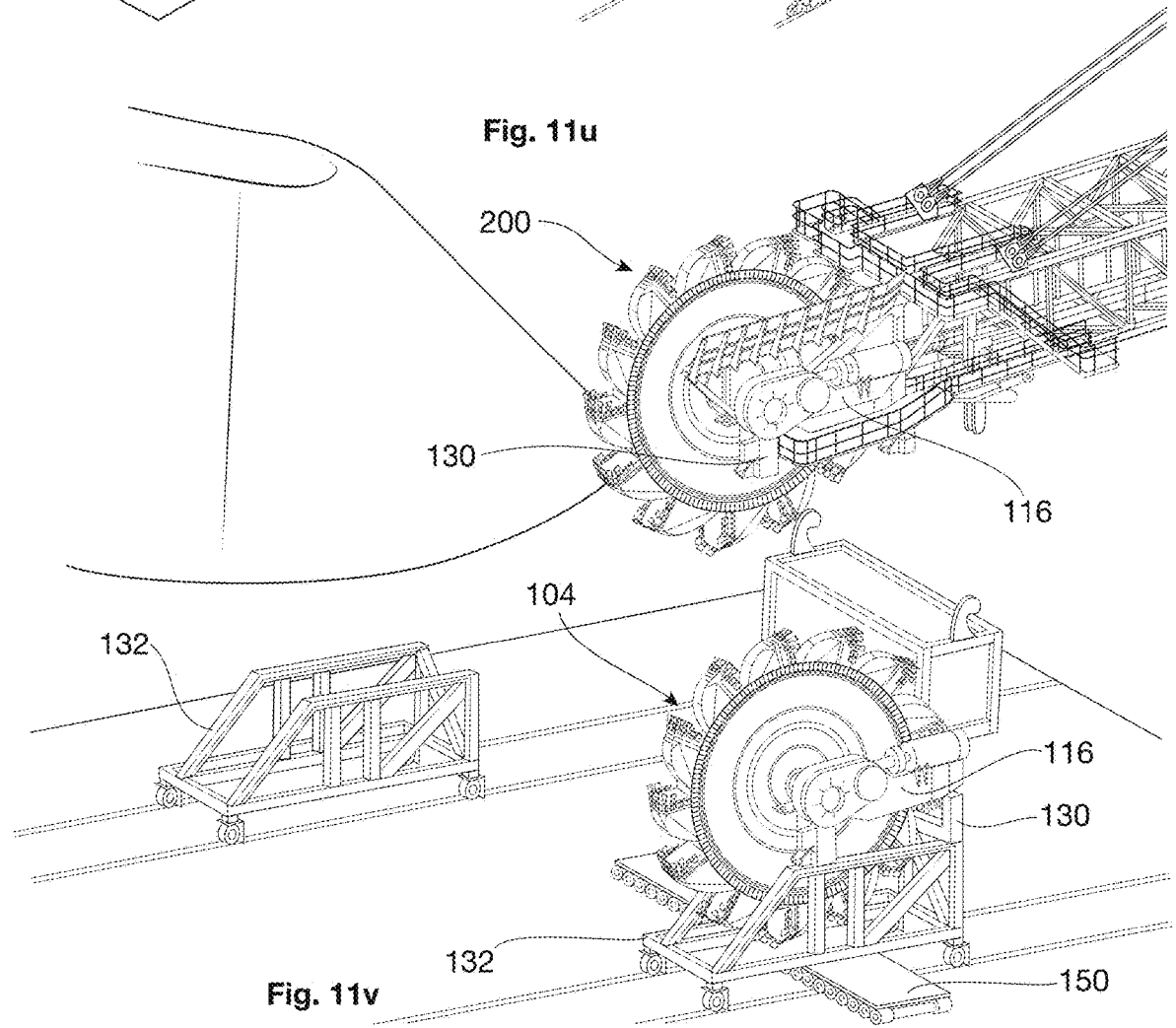

As shown in FIG. 11t to FIG. 11v the boom 103 can be lowered until the ballast weight 119 touch the ground. The ballast weight may be detached and removed from the ballast engaging means 118. The bucket wheel machine 100 now comprise a replacement operating block 200 and can be recommissioned and put back into operation. The worn operating block 104 can be repaired/maintained at the maintenance area or transported by an SPMT or Trailer for refurbishment.

Although in the figures, aspects of the invention are shown in combination, the different aspects described herein also can be applied separately.

LIST OF REFERENCE SIGNS

100 Bucket wheel machine
101 Bucket
102 Base of bucket wheel machine
103 Boom
104 Operating block
106 Bucket wheel
108 Bucket wheel chute
110 Conveyor
112 Chute side bearing
114 Drive side bearing
116 Bucket wheel drive
118 Ballast engaging means
119 Ballast weight
120 Ring chute
121 Drive cover
130 Support frame
131 Chute support frame
132 Support structure
134 Support frame parallel bar
135 Support frame crossbar
136 Main structure of the bucket wheel machine
140 Support area
142 Receiving surface
144 Wheels
150 SPMT
200 Replacement operating block

The invention claimed is:

1. A bucket wheel machine comprising a base and an operating block, said operating block comprising a bucket wheel, a pair of bearings, and at least one of a ring chute, a bucket wheel chute, and a bucket wheel drive, the operating block being detachably attached to the base of the bucket wheel machine, the bucket wheel being rotatably connected to the pair of bearings, wherein the operating block further comprises a support frame connected to pair of bearings, the entire support frame being located below the pair of bearings and being adapted for supporting the weight of the operating block.

2. The bucket wheel machine according to claim 1, wherein the bucket wheel machine comprises a boom located adjacent the operating block and a main structure of the bucket wheel machine and the support frame being attached to the boom.

3. The bucket wheel machine according to claim 1, wherein the support frame comprises one or more support areas located below the pair of bearings.

4. The bucket wheel machine according to claim 1, wherein the support frame comprises one or more support areas located on different sides of the bucket wheel.

5. The bucket wheel machine according to claim 2, wherein the bucket wheel machine comprises ballast engagement means located at an underside of the boom (or below the) base.

6. A bucket wheel machine system comprising:
the bucket wheel machine according to claim 1; and
a support structure for supporting the operating block, said support structure having a receiving surface located in an upper part of the support structure adapted for having the operating block placed thereon.

7. The bucket wheel machine system according to claim 6 wherein the support frame comprises one or more support areas and the receiving surface of the support structure being engageable with the one or more support areas of the operating block.

8. The bucket wheel machine system according to claim 6 the support structure being adapted for moving.

9. The bucket wheel machine system according to claim 8 wherein the support structure comprises wheels.

10. The bucket wheel machine system according to claim 6, wherein the system further comprises a ballast weight and wherein the bucket wheel machine and the ballast weight comprise mutually corresponding engaging means.

11. A method of removing an operating block from a base of a bucket wheel machine, said operating block comprising a bucket wheel, a pair of bearings, and at least one of a ring chute, a bucket wheel chute, and a bucket wheel drive, the bucket wheel being rotatably connected to the pair of bearings, wherein the operating block further comprises a support frame connected to said pair of bearings, the entire support frame being located below the pair of bearings and being adapted for supporting the weight of the operating block, the method comprising:

providing a support structure having a receiving surface located in an upper part of the support structure and a bucket wheel machine said bucket wheel machine having an operating block detachably attached to the base;

approximating and contacting the bottom of the support frame and the receiving surface of the support structure;

detaching the operating block from the base by removing any connection means connecting the bucket wheel machine and the operating block; and separating the operating block from the base.

12. The method of removing an operating block according to claim 11, wherein the method further comprises a step of connecting ballast weight to the bucket wheel machine.

13. A method of maintaining an operating block of a bucket wheel machine, said operating block comprising a bucket wheel and at least one of a ring chute, bucket wheel chute, and a drive, the method comprising the steps according to claim 11 and further comprising the steps of:

providing a replacement operating block, said operating block being located on a support structure;

approximating the replacement operating block and the base;

contacting the replacement operating block with the base;

attaching the replacement operating block to the base by connecting the connection means;

separating the replacement operating block from the support structure.

\* \* \* \* \*